(12) United States Patent
Cooperman

(10) Patent No.: US 7,770,534 B2
(45) Date of Patent: *Aug. 10, 2010

(54) CHANGED CONDITION INDICATOR

(76) Inventor: Isadore Cooperman, 62 Ivy Rd., Freehold, NJ (US) 07729

( * ) Notice: Subject to any disclaimer, the term of this patent is extended or adjusted under 35 U.S.C. 154(b) by 539 days.

This patent is subject to a terminal disclaimer.

(21) Appl. No.: 11/375,307

(22) Filed: Mar. 14, 2006

(65) Prior Publication Data

US 2007/0151502 A1 Jul. 5, 2007

Related U.S. Application Data

(63) Continuation-in-part of application No. 10/782,801, filed on Feb. 23, 2004, now Pat. No. 7,011,037, which is a continuation-in-part of application No. 09/925,538, filed on Aug. 10, 2001, now Pat. No. 6,694,913.

(51) Int. Cl.
*G01K 1/02* (2006.01)
(52) U.S. Cl. .................. 116/216; 116/206; 116/207; 374/106
(58) Field of Classification Search ................. 116/216, 116/206, 207, 217, 218, 219, 220; 374/106, 374/160, 162; 252/962; 426/88
See application file for complete search history.

(56) References Cited

U.S. PATENT DOCUMENTS

| 2,823,131 | A | | 2/1958 | Powder |
| 2,850,393 | A | | 9/1958 | Romito |
| 3,082,624 | A | * | 3/1963 | Renier ..................... 374/102 |

(Continued)

FOREIGN PATENT DOCUMENTS

DE   22 57 838   6/1973

(Continued)

*Primary Examiner*—Amy Cohen Johnson
(74) *Attorney, Agent, or Firm*—Porzio, Bromberg & Newman, P.C.

(57) ABSTRACT

A system and method for indication of temperature exposures beyond a set of predetermined limits employs the salts of weak acid-strong base or of a strong acid-weak base compound as reactants. A device includes a housing and capsule. A first reactant and a liquid are included within the capsule. The liquid is chosen such that it expands upon freezing. The capsule is sized such that when the liquid freezes and expands, the capsule fractures. A second reactant is provided within the housing. The location of the second reactant and the method of attaching (if any) the second reactant to the housing may take various forms. When the liquid within the capsule freezes, it expands and fractures the capsule. Upon thawing, the reactant within the capsule escapes and mixes with the reactant located outside the capsule. A second embodiment is a time-temperature indicator. A flexible housing is used, allowing the user to manually deform the housing to fracture a capsule enclosed therein. The reactants combine to produce a color. The color is chosen to be a different color than the housing, allowing a person viewing the indicator device to quickly and easily determine the status of the object being monitored. The threshold temperature at which the device will indicate a changed condition may be varied. Exemplary temperatures include below the freezing temperature, at the freezing temperature, and above the freezing temperature. The capsule composition may be varied such that it melts at a predetermined temperature. Thus, the device may also be used to indicate whether a high temperature has been met or exceeded.

7 Claims, 4 Drawing Sheets

U.S. PATENT DOCUMENTS

| | | | |
|---|---|---|---|
| 3,177,843 A | 4/1965 | Geocaris | |
| 3,233,459 A | 2/1966 | Loomis et al. | |
| 3,389,194 A | 6/1968 | Somerville | |
| 3,437,070 A * | 4/1969 | Campbell | 116/207 |
| 3,695,903 A | 10/1972 | Telkes et al. | |
| 3,751,382 A | 8/1973 | Ljunberg et al. | |
| 3,786,777 A | 1/1974 | Smith et al. | |
| 3,822,189 A | 7/1974 | Tornamarck | |
| 3,873,269 A * | 3/1975 | Kraffczyk et al. | 435/12 |
| 3,942,467 A * | 3/1976 | Witonsky | 116/207 |
| 3,958,528 A | 5/1976 | Hill | |
| 4,022,149 A | 5/1977 | Berger | |
| 4,028,876 A | 6/1977 | Delatorre | |
| 4,120,818 A | 10/1978 | Swindells et al. | |
| 4,132,186 A | 1/1979 | Manske et al. | |
| 4,145,918 A | 3/1979 | Couch et al. | |
| 4,148,748 A | 4/1979 | Hanlon et al. | |
| 4,163,427 A | 8/1979 | Cooperman et al. | |
| 4,191,125 A | 3/1980 | Johnson | |
| 4,280,361 A | 7/1981 | Sala | |
| 4,327,117 A | 4/1982 | Lenack et al. | |
| 4,457,252 A | 7/1984 | Manske | |
| 4,601,588 A | 7/1986 | Takahara et al. | |
| 4,784,876 A | 11/1988 | Walker, Jr. et al. | |
| 5,085,802 A | 2/1992 | Jalinski | |
| 5,111,768 A | 5/1992 | Larsson et al. | |
| 5,158,364 A * | 10/1992 | Labes | 374/106 |
| 5,182,212 A | 1/1993 | Jalinski | |
| 5,239,942 A | 8/1993 | Ignacio et al. | |
| 5,254,473 A | 10/1993 | Patel | |
| 5,404,834 A | 4/1995 | Murphy | |
| 5,695,284 A | 12/1997 | Waters | |
| 5,964,181 A | 10/1999 | Pereyra et al. | |
| 6,030,118 A | 2/2000 | Schneider et al. | |
| 6,694,913 B2 * | 2/2004 | Cooperman | 116/216 |
| 6,884,394 B1 | 4/2005 | Hehenberger et al. | |
| 7,011,037 B2 * | 3/2006 | Cooperman | 116/216 |
| 2006/0032774 A1 * | 2/2006 | Norrby et al. | 206/459.1 |

FOREIGN PATENT DOCUMENTS

| | | |
|---|---|---|
| FR | 2 349 824 | 11/1977 |
| GB | 2 130 720 | 6/1984 |
| WO | WO 92 09870 | 6/1992 |

* cited by examiner

CHANGED CONDITION INDICATOR

CROSS-REFERENCE TO RELATED APPLICATIONS

This application is a Continuation-in-Part of Ser. No. 10/782,801 filed Feb. 23, 2004 U.S. Pat. No. 7,011,037 entitled Changed Condition Indicator issued Mar. 14, 2006, which is a Continuation-in-Part of Ser. No. 09/925,538 filed Aug. 10, 2001 U.S. Pat. No. 6,694,913 entitled Changed Condition Indicator which issued on Feb. 24, 2004.

FIELD OF THE INVENTION

This invention relates to an indicating apparatus and more particularly, to devices for indicating a change in temperature.

BACKGROUND OF THE INVENTION

In the preparation and storage of foodstuffs, both raw and cooked, it is desirable to have some manner of indicating whether frozen items have previously been thawed. This is true in both home and commercial (such as a grocery store, supermarket, or restaurant) settings. Such information is useful from health, safety, and nutritional standpoints.

In the healthcare industry, it is well known that some vaccines, blood, various medications, etc. are temperature-sensitive. Because such materials may not function properly if frozen and then thawed, it is not only desirable but also essential to know whether these materials have been previously frozen. Similarly, it would be very beneficial to know whether material, which is stored frozen, is allowed to thaw and subsequently is refrozen. Furthermore, it would be very beneficial to know whether material has been cooled below and then heated above a threshold temperature other than the freezing temperature (i.e., above or below the freezing temperature).

It is also desirable in the foodstuff, medical, and other industries to know whether material has been raised above a certain temperature. For example, some vaccines are known to not function properly if stored above a certain temperature. Thus, it would be beneficial to know whether stored material has previously been heated above a predetermined temperature.

Maximum-minimum thermometers may be used to indicate the range of temperatures to which an item has been exposed. However, the use of such apparatus with every item in a frozen food department of a grocery store or supermarket, or with every container of vaccine, blood, drug, or other heat fragile item, is both impracticable and prohibitively costly.

Freeze-thaw indicators are known. For example, the Applicant's previous patent, U.S. Pat. No. 4,163,427, which is incorporated by reference herein in its entirety, discloses an apparatus in which melting ice is used to activate a dye formation in producing a color indication of thawing. The present invention uses a pigment rather than a dye to indicate a transition over the threshold temperature. The use of a pigment allows for a greater clarity of indication, a reduced chance of error, and a reduction in manufacturing costs.

Another known device is marketed under the name "Cold-Mark Freeze Indicators." This device comprises three liquids that provide a color change upon extended exposure below a certain temperature and another color change upon extended exposure above the temperature. However, this device is much larger than, and much more expensive than, the device of the present invention.

SUMMARY OF THE INVENTION

The present invention is a system and method for indication of temperature exposures beyond a set of predetermined limits employs the salts of weak acid-strong base or of a strong acid-weak base compound as reactants.

BRIEF DESCRIPTION OF THE DRAWINGS

A more complete understanding of the present invention may be obtained from consideration of the following description in conjunction with the drawings in which like reference characters reference like elements, and wherein.

DETAILED DESCRIPTION OF VARIOUS ILLUSTRATIVE EMBODIMENTS

Figure 1:
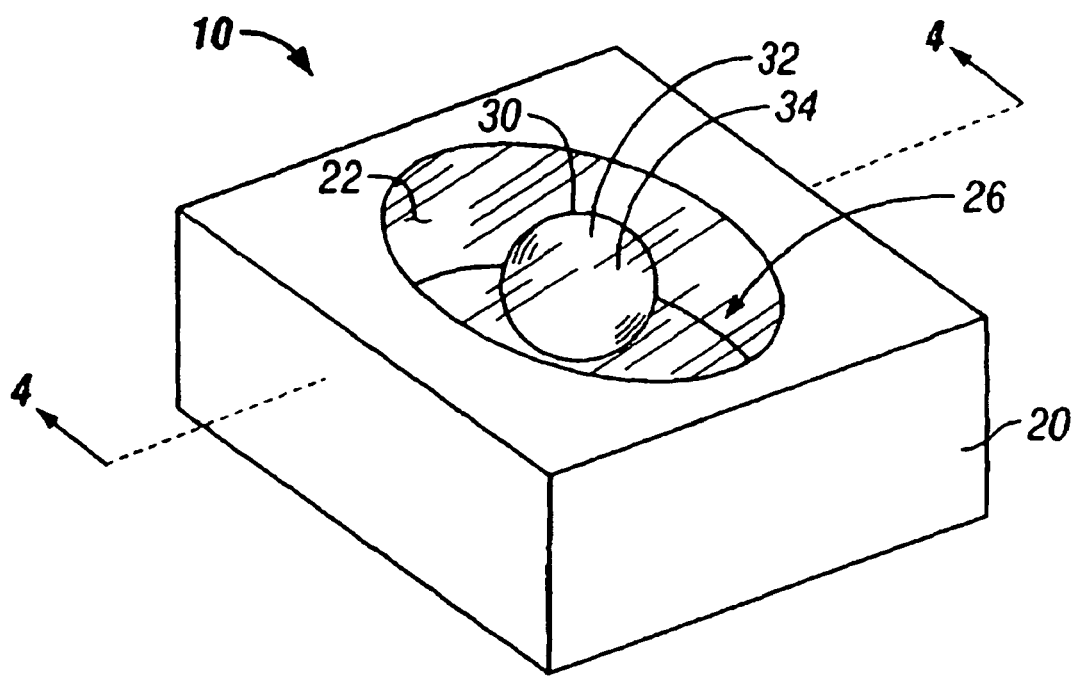
FIG. 1 is a perspective view of a preferred embodiment of the indicator of the present invention.

The present invention is a system and method for indication of temperature exposures beyond a set of predetermined limits. The apparatus of the present invention indicates a temperature transition condition using two reactants that combine to produce a pigment. A pigment is insoluble in the medium in which it is applied, while a dye is soluble. The use of a pigment is superior to the use of a dye since, for example, a pigment can produce a more brilliant color with smaller amounts of each reactant.

Additionally, pigment reactants are less likely to produce a color change with anything other than the complementary reactant.

A housing is provided, with one or more capsules are provided within the housing. As used herein, "capsule" refers to any closed receptacle and includes microcapsules. A first reactant and a liquid are provided inside the capsule. The liquid is chosen such that it expands upon freezing. The capsule is designed such that when the liquid freezes and expands, the capsule fractures. A second reactant is provided within the housing. The location of the second reactant and the means of coupling (if any) to the housing may take various forms. For example, the second reactant may take the form of a coating on the housing. The second reactant may also be mixed with an adhesive for coupling the second reactant to the housing. The second reactant may also take the form of a coating on the outside of the capsule. The second reactant may be coupled to a piece of material, such as paper, and the material placed inside the housing.

When the capsule and the liquid located therein freeze, the liquid expands. Since the capsule does not expand upon freezing, the expansion of the liquid fractures the capsule. When the capsule is subsequently thawed, the liquid melts, releasing the first reactant. The first and second reactants then combine to form a pigment. The pigment is a brilliant color that is chosen to be a different color than the housing, allowing a person viewing the changed condition indicator device to quickly and easily know whether the device has been previously frozen and thawed.

The device of the present invention may also be used as a high temperature indicator, either alone or in conjunction with the low temperature indicator embodiment as a dual indicator. The composition of the capsules may be altered such that the capsules will melt at a predetermined high temperature. When the capsules are raised to this temperature, they melt, releasing the enclosed reactant. The reactants then mix, forming a pigment.

The device of the present invention may be attached to any number of items in order to determine whether the temperature of items has been allowed to increase above a threshold temperature. Exemplary threshold temperatures include the freezing temperature and a temperature above which the item being monitored will be rendered ineffective. Exemplary preferred items to monitor include, but are not limited to, vaccines, other medications, food, and other temperature-sensitive items.

The device of the present invention may also be initiated manually. Rather than fracture via expansion upon freezing, the device of the current invention can be initiated by manually fracturing the capsule, thus allowing the device to be used as a time-temperature indicator.

The present invention is a system and method for indication of temperature exposures beyond a set of predetermined limits that involves two or more reactants which produce an irreversible color change when a thermal threshold is crossed. One or more of the reactants are incorporated in microcapsules and one or more of the reactants are in a coating, gel, or solution which is in direct contact with the microcapsules.

The microcapsules can be composed of paraffin wax, wax blends, natural plastics, synthetic resins, as well as a variety of other suitable compatible materials. The microcapsules have an interior variable volume and are of such size that the ratio of the interior volume to capsule wall volume can vary to provide proper mechanical and handling properties while meeting the thermal criteria requirements. Almost any shape or form of container can be used to seal the co-reactant systems together with the microcapsules.

Many of the reactants can be used for both high temperature conditions as well as low temperature conditions depending on the co-reactants used as coatings, gels and solvents which are in contact with the microcapsules.

One embodiment of the present invention is a system and method for indication of temperature exposures beyond a set of predetermined limits that employs the salts of a weak acid-strong base or of a strong acid-weak base compound as reactants, used together with different co-reactants and with different capsule walls to give both high temperature and low temperature indications with the same salt compound.

By varying the specific reactants, microcapsule wall compositions, and the specific design of the enclosure, a series of simple manufacturer items which indicate low temperature threshold, high temperature threshold, low and high temperature threshold, as well as exposure time temperature threshold can be manufactured on one type of machine.

An exposure time temperature threshold indicator is implemented using a whole series of enzymatic reactions and substrates together with flexible containers in conjunction with the microcapsule technique to separate the enzymes from the substrate until activated by bursting.

By incorporating together with the reactants, non-reactive colorless UV (Ultra Violet) fluorescing compounds within the walls of the microcapsules, the body of the container or both, a method of anti-counterfeiting protection is provided.

To more completely understand the range of reactants and indicators that can be used and incorporated into the present invention's system and method for indication of temperature exposures beyond a set of predetermined limits, tables 1 through 7 are provided. Table 1 represents alkali-metals, corresponding water soluble salts, resultant inorganic precipitants, and color of the precipitant.

TABLE 1

| Alkali-Metals | Water Soluble Salts | PRECIPITANTS. Inorganic precipitants *water soluble | Color of Product |
|---|---|---|---|
| Potassium (#19) | $KOH$; $KC_2H_3O_2$; $K_2Al_2O_4 \cdot 3H_2O$; $KBOC_4H_4O_6 \cdot \frac{1}{2}H_2O$; $K_2AsO_4$; $KH_2AsO_4$; $KAsO_2$; $K_2HAsO_4$; $KAuCl_4$; $K_2B_4O_7 \cdot H_2O$; $KBr$; $KBrO_3$; $K_2PtBr_6$; $K_2CO_3$; $KHCO_3$; $KCl$; $KClO$; $KClO_3$; $KClO_4$; $K_2CrO_4$; $K_2Cr_2O_7$; $KCN$; $KCNO$; $KAg(CN)_2$; $K_3Fe(CN)_6$; $K_4Fe(CN)_6 \cdot 3H_2O$; $KF$; $KBF_4$; $3KF-AlF_3$; $KI$; $KI_3$; $KIO_3$; $KIO_4$; $KMnO_4$; $K_2MNO_4$; $K_2MoO_4$; $KNO_2$; $KNO_3$; $K_2C_2O_4 \cdot H_2O$; $KOH$; $KH_2PO_4$; $K_4P_2O_7$; $K_2HPO_3$; $K_3PO_4$; $K_2SiO_3$; $K_2SeO_4$; $K_2S_5$; $K_2SO_3 \cdot 2H_2O$; $KHSO_4$; $K_2SO_4$; $K_2S_2O_5$; $K_2S_2O_7$; $K_2S_2O_8$; $KCNS$; $K_2C_4H_2O_6 \cdot \frac{1}{2}H_2O$; $K_2WO_4 \cdot 2H_2O$; $KReO_4$. | 1)*Sodium cobaltinitrite (solid) 2)*Sodium cobaltinitrite (solid) and *silver nitrate 3)*Dipicrylamine 4)*sodium tetraphenylborate 5)all other tests are for the various water soluble salts of the particular elements involved as indicted in the other tables for that element | 1)yellow 2)yellow 3)red 4)white 5)See individual elements in the water soluble salts column |
| Rubidium (#37) | $RbCO3$; $RbHCO3$; $Rb2CO3$; $RbCrO4$; $Rb2CrO4$; $RbF$; $RbBr$; $RBrO3$; $RbCl$; $RbI$; $RbIO3$; $RbOH$; $RbNO3$; $Rb2S$; $RbSO4$; $Rb2$ | 1)*LiDipicrylaminate 2)*$AuBr_3$ + *$H_2PtBr_6$ 3)*$Na_2AgBi(NO_2)_6$ | 1)red 2)black-brown 3)yellow |

TABLE 1-continued

| Alkali-Metals | Water Soluble Salts | PRECIPITANTS. Inorganic precipitants *water soluble | Color of Product |
|---|---|---|---|
| Cesium (#55) | CsF; CsBr; CsBRO$_3$; CsCl; CsClO$_3$; CsClO$_4$; CsI; CsIO$_3$; CsNO$_3$; Cs$_2$CO$_3$ | 1)*AuBr$_3$ + *H$_2$PtBr$_6$ 2)*Potassium-bismuth iodide 3)*AuCl$_3$ + PdCl$_2$ 4)*Sodium triphenyl(cyanoborate) | 1)deep black 2)orange-yellow 3)black-brown 4)black-brown |
| Lithium (#3) | LiC$_2$O$_4$; LiC$_2$H$_2$O$_2$•2H$_2$O; LiHCO$_3$; LiBr; LiBrO$_3$; LiCL; LiClO$_3$; LiClO$_4$; LiI; LiIO$_3$; LiHPO$_3$; LiNO$_2$; LiNO$_3$; LiOH; LiSCN; Li$_2$CO$_3$; Li$_2$S; Li$_2$SO$_4$; Li$_2$SiO$_3$; Li$_3$(PO$_4$)$_3$ | 1)Thoron 2)*Complex ferric periodate | 1)yellow 2)yellow-white |
| Sodium (#11) | NaC$_2$H$_3$O$_2$; Na$_2$C$_2$O$_4$; NaAlO$_2$; Na$_3$AsO$_4$•12H$_2$0; Na2HAsO$_4$•12H$_2$O; Na$_2$HAsO$_3$; NaBO$_2$; Na$_2$B$_4$O$_7$•10H$_2$O; NaBr; NaBrO$_3$; NaCO$_3$•H$_2$O; Na$_2$CO$_3$•10H$_2$O; NaHCO$_3$; NaCl; NaClO•2.5H$_2$O; NaClO$_2$; NaClO$_3$; NaClO$_4$; NaPtCl$_4$•4H$_2$O; Na$_2$PtCl$_6$•6H$_2$O; Na$_2$CrO$_4$•10H$_2$O; Na$_2$Cr$_2$O$_7$•2H$_2$O; NaCN; NaCu(CN)$_2$; NaFe(CN)$_6$•H$_2$O; NaFe(CN)$_6$•10H$_2$O; Na$_2$Fe(CN)$_5$NO•2H$_2$O; NaCbO$_3$; NaF; 3NaF-AlF$_3$; NaCHO$_2$; NaI; NaIO$_3$; NaIO$_4$; NaMnO$_4$•3H$_2$O; Na$_2$MnO$_4$•10H$_2$O; Na$_2$MoO$_4$; NaNO$_2$; NaNO$_3$; NaOH; Na$_2$C$_2$O$_4$; NaH$_2$PO$_2$•H$_2$O; NaHPO$_3$•5H$_2$0; NaH$_2$PO$_4$•H$_2$O; Na$_2$HPO$_4$•12H$_2$O; Na$_2$PO$_4$•12H$_2$O; Na$_3$PO$_4$; Na$_4$P$_2$O$_7$•10H$_2$0; NaKCO$_3$, 6H$_2$O; NaReO$_4$; Na$_2$SeO$_3$; NaSeO$_4$; NaSiO$_3$; Na$_2$Si$_4$O$_9$; NaSn(OH)$_4$; Na$_2$S; Na$_2$S$_5$; Na$_2$SO$_3$; Na$_2$S$_2$O$_3$•5H$_2$O; NaHSO$_4$; Na$_2$SO$_4$; Na$_2$SO$_4$•10H$_2$O; Na$_2$S$_2$O$_5$; NaCNS; Na$_2$C$_4$H$_4$O$_6$•2H$_2$O; Na$_3$VO$_4$; Na$_2$WO$_4$; | tests for sodium 1)*Zinc uranyl acetate 2)*Zinc uranyl acetate in ultraviolet light. 3)Alpha-Methoxyphenylacetic acid 4)*Magnesium 8-amino-1-naphthalenesulfonate 5)5-benzamidoanthroquinone-2-sulfonic acid 6)*potassium croconate all other tests are for the various water soluble salts of the particular elements involved as indicated in the other tables for those elements | 1)yellow 2)green-yellow fluorescence 3)white 4)dark grey 5)orange-yellow 6)red See the table for the individual elements in the water soluble salt column. |

Table 2 represents alkali earth metals, corresponding water soluble salts, resultant inorganic precipitants, and color of the precipitant.

TABLE 2

| Alkali Earth Metals | Water Soluble Salts | PRECIPITANTS. Inorganic precipitants *water soluble | Color of Product |
|---|---|---|---|
| Beryllium (#4) | BeBr$_2$; BeCl$_2$; BeI$_2$; Be(ClO4)2; Be(NO$_3$)$_2$•3H$_2$O; BeC$_2$O$_4$•3H$_2$O; BeSO$_4$•4H$_2$O | 1)Quinalizarin; 2)p-Nitrobenzeneazoorcinol; 3)*Beryllon = [tetrasodium 2-(3,6-disulfo-8-hydroxynaphthylazo)-1,8-dihydroxynaphthalene-3,6-disulfonate] = (Beryllon II); 4)Chrome Azural S; 5)Chrome Azural S + Cetyltrimethylammonium bromide; 6)Erichrome Cyanine R; 7)Erichrome Cyanine R + Cetyltrimethylammonium bromide | 1)blue 2)orange-red 3)light blue 4)blue-violet 5)blue 6)red 7)red |

TABLE 2-continued

| Alkali Earth Metals | Water Soluble Salts | PRECIPITANTS. Inorganic precipitants *water soluble | Color of Product |
|---|---|---|---|
| | | 8)Morin | 8)green-yellow fluorescence |
| Magnesium (#12) | $Mg(C_2H_3O_2)_2 \cdot 4H_2O$; $MgBr_2$, $MgCl_2 \cdot 6H_2O$; $MgI_2$, $Mg(NO_3)_2 \cdot 6H_2O$; $MgSO_3$; $MgSO_4 \cdot 7H_2O$; $Mg(BrO_3)_2$; $Mg(ClO_3)_2$; $Mg(ClO_4)_2$; $Mg(IO_3)_2$; $MgCr_2O_7$; $Mg(NO_2)_2$; $MgS_2O_3$. | 1)*Alkali hypoiodite; 2)Quinalizarin; 3)p-Nitrobenzeneazo-alpha-naphthol; 4)Titan Yellow; 5)p-Nitrobenzeneresorcinol. 6)Eriochrome Black T 7)8-Hydroxyquinoline 8)8-Hydroxyquinoline + Butylamine Butylamine 9)Xylidyl Blue 10)Chromotrope 2B 11)*pentamethinedibarbituric acid 12)*Ammonia + phenolphthalein 13)Diphenylcarbizide | 1)brown 2)blue 3)blue 4)flame red 5)blue 6)? 7)? 8)? 9)purple 10)blue 11)blue 12)pink 13)deep red |
| Calcium (#20) | $Ca(C_2H_3O_2)_2 \cdot H_2O$; $CaBr_2$; $CaCl_2 \cdot 6H_2O$; $Ca(ClO3)_2 \cdot 4H_2O$; $Ca(ClO_4)_2$; $CaI2$; $Ca(IO3)2$; $CaCrO_4$; $Ca(NO2)2$; $Ca(NO_3)_2 \cdot 4H_2O$, $Ca(MnO_4)_2 \cdot 4H_2O$, $Ca(H_2PO_2)_2$; $CaSO4$; $CaSeO_4 \cdot 2H_2O$ | 1)Chlorophosphonazo III; 2)Glyoxal-bis(2hydroxyanil); 3)Murexide; 4)Phthalein Purple; 5)*Ammonium ferrocyanide, 6)*Dihydoxytartaric acid osazone (solid) 7)*Sodium rhodizonate. And alkali hydroxide 8)Chloroindazone C 9)*Ferric fluoride and *potassium thiocyanate 10)Alizarin Red S and *Zirconium oxychloride 11)Calcichrome | 1)? 2)blue 3)? 4? 5)white 6)white flock 7)violet 8)red-violet 9)red 10)red-violet 11)blue |
| Strontium (#38) | $Sr(OH)_2$; $SrBr_2 \cdot 6H_2O$; $Sr(BrO_3)_2$; $SrCl_2 \cdot 6H_2O$, $Sr(ClO_2)_2$, $Sr(ClO_3)_2$; $SrI_2 \cdot 6H_2O$; $Sr(IO_3)_2$; $Sr(NO_2)_2 \cdot 4H_2O$; $Sr(NO_3)_2$; $SrS_2O_5$. | 1)*Sodium rhodizonate. | 1)red-brown |
| Barium (#56) | $BaO$; $Ba(OH)_2$; $BaBr_2 \cdot 2H_2O$, $Ba(BrO_3)_2$; $BaCl_2 \cdot 2H_2O$; $Ba(ClO_2)_2$; $Ba(ClO_3)_2 \cdot 2H_2O$; $Ba(ClO_4)_2$, $BaI_2$, $Ba(NO_2)_2$; $Ba(NO_3)_2$; $Ba(MnO_4)_2$; $BaH_4(PO_4)$; $BaS$; $Ba(SCN)_2$; $BaC_2O_4$; $Ba(C_2H_3O_2) \cdot 2H_2O$. | 1)*Sodium rhodizonate; 2)Tetrahydroxyquinone + KCl; 3)*Sulfonazo III 4)*Induction of precipitation of lead sulfate 5)*Potassium permanganate and *sodium sulfate 6)Nitro-3-hydroxybenzoic acid | 1)red-brown 2)red (acid) 3)blue-green 4)white 5)violet 6)red ring |

Table 3 represents transition elements, corresponding water soluble salts, resultant inorganic precipitants, and color of the precipitant.

TABLE 3

| Transition Element | Water Soluble Salts | PRECIPITANTS. Inorganic precipitants *water soluble | Color of Product |
|---|---|---|---|
| Fourth Row | | | |
| Scandium (#21) | $ScCl_3$, $ScBr_3$, $ScI_3$, $Sc_2(SO_4)_3$, $Sc(NO_3)_3$ | 1)Tetrahydroxyflavanol ("Morin"); 2)*Alizarin red S; 3)*Xylenol Orange; | 1)green fluorescence 2)?; 3)?; |

TABLE 3-continued

| Transition Element | Water Soluble Salts | PRECIPITANTS. Inorganic precipitants *water soluble | Color of Product |
|---|---|---|---|
| | | 4)Arsenazo III; | 4)?; |
| | | 5)Chrome Azural S. | 5)?. |
| | | 6)Methylthymol Blue | 6)deep blue |
| Titanium (#22) | $TiCl_2$; $TiCl_3$; $TiCl_4$ $TiK_2F_6$, $Ti_2(C_2O_4)_3 \cdot 10H_2O$, $TiO(C_2O_4K)_2 \cdot 2H_2O$, $Ti(SO_4)_2 \cdot 9H_2O$, $TiOSO_4 \cdot H_2SO_4 \cdot 8H_2O$ | 1)*Pyrocatechol, | 1)yellowish-red |
| | | 2)*Chromotropic Acid; | 2)brown-red |
| | | 3))*Chromotropic Acid + conc. *Sulfuric acid | 3)violet |
| | | 4)*Tiron; | 4)orange-red |
| | | 5)*Hydrogen peroxide; | 5)yellow |
| | | 6)*Tannin + antipyrine; | 6)red |
| | | 7)Diantipyrinylmethane. | 7)? |
| | | 8)*Methylene blue and zinc. | 8)discharge of methylene blue |
| | | 9)Acetylacetone | 9)Ti (III) - red Ti (IV) - yellow |
| | | 10)Morin | 10)brown |
| | | 11)*Alizarin Red S and zinc | 11)green |
| | | 12)Resoflavine | 12)red-orange |
| | | 13)Tetraphenylarsonium chloride | 13)yellow |
| | | 14)Tetraphenylphosphonium chloride | 14)yellow |
| | | 15)Benzyl 2-hydroxyphenyl ketone | 15)yellow |
| | | 16)Ammonium hypophosphite melt | 16)blue |
| Vanadium (#23) | $Na(C_6H_{14}O_3)_2V(CO)_6$*, $V_2O_2Cl_4 \cdot 5H_2O$, $VOSO_4 \cdot 2H_2O$, $VCl_2$, $VCl_3$, $VCl_4$. | 1)*Cacotheline; | 1)violet |
| | | 2)8-Hydroxyquinoline; | 2)blue-black |
| | | 3)Aniline; | 3)aniline black |
| | | 4)Phosphomolybdic acid; | 4)molybdenum blue |
| | | 5)*Hydrogen peroxide; | 5)red-brown to blood red. |
| | | 6)N-Benzoyl-N-phenylhydoxylamine; | 6)? |
| | | 7)4-(2-pyridylazo)resorcinol. | 7)? |
| | | 8)*Reduction of ferric salts by tervalent vanadium | 8)red |
| | | 9)alpha-Benzoinoxime | 9)yellow |
| | | 10)3.3'-Dimethylnaphthidine | 10)blue-violet |
| | | 11)Quercetin | 11)green |
| | | 12)2-(salicylideneimino)benzoic acid | 12)violet |
| | | 13)Sulphosalicylic acid and *phosphoric acid | 13)blue |
| | | 14)*Koji acid | 14)red-brown |
| | | 15)*8-Hydroxy-7-iodoquinoline-5-sulfonic acid ("Ferron") | 15)green |
| | | 16)Resorcinol and *syrupy phosphoric acid | 16)deep blue (fluoresces red under U, V,) |
| | | 17)*Ammonium hypophosohite melt | 17)green |
| Chromium (#24) | $Cr(C_2H_3O_3)_3 \cdot H_2O$, $CrO_3$, $CrCl_3 \cdot 6H_2O$, $CrF_3 \cdot 4H_2O$, $CrF_3 \cdot 9H_2O$, $Cr(OH)(HCOO)_2$, $CrF_3 \cdot 9H_2O$, $Cr(OH)(HCOO)_2$, $Cr(NO_3)_3 \cdot 9H_2O$, $Cr(NO_3)_3 \cdot 9H_2O$, $CrSO_4 \cdot 7H_2O$, $Cr_2(SO_4)_3 \cdot 15H_2O$, $Cr_2(SO_4)_3 \cdot 18H_2O$, $CrNH_4(SO_4)_2 \cdot 12H_2O$, $CrK(SO_4)_2 \cdot 12H_2O$, $CrBr_2$, $CrCl_2$, $CrCL_3$, $CrC_2O_4 \cdot H_2O$, | 1)1,5-Diphenylcarbizide (for chromates, alkaline); | 1)violet (alk.) to red |
| | | 2)4-(2-Pyridylazo)resorcinol; | 2)? |
| | | 3)4-(2-Pyridylazo)resorcinol + *Tetradecyldimethylbenzyl-ammonium chloride; | 3)? |
| | | 4)*Acetic acid Benzidine (for chromates) solution; | 4)blue |
| | | 5)Acid Alizarin RC; | 5)orange lake |
| | | 6)*Silver nitrate (for chromates); | 6)red |
| | | 7)*Lead acetate (for chromates); | 7)yellow |
| | | 8)4-(2-Pyridylazo)resorcinol + *Hydrogen peroxide. | 8)? |
| | | 9)Chromotropic acid | 9)brown-red |
| | | 10)1,2-diaminocyclohexane-N,N,N'N'-tetraacetic acid | 10)reddish-violet |
| | | 11)Diphenylcarbizide + phthalicanhydride | 11)violet |
| | | 12)2,7-Diamino-diphenylene oxide | 12)blue |
| | | 13)Sel-K5 exchange resin | 13)red-violet($Cr^{+6}$) |
| | | 14)*Hydrogen peroxide + cation | 14)gray, violet- |

TABLE 3-continued

| Transition Element | Water Soluble Salts | PRECIPITANTS. Inorganic precipitants *water soluble | Color of Product |
|---|---|---|---|
| | | exchange resin(Amberlite IRA-4II [Cl— form 30 mesh) | blue, or violet brown |
| | | 15)Methyl violet | 15)deep blue |
| | | 16)Pyrrole | 16)"pyrrole blue" |
| | | 17)Strychnine | 17)blue-violet to red |
| | | 18)Ammonium hypophosphite melt | 18)green |
| Manganese (#25) | $Mn(C_2H_3O_2)_2 \cdot 4H_2O$, $MnSO_4 \cdot (NH_4)_2SO_4 \cdot 6H_2O$, $MnSO_4 \cdot (NH_4)_2SO_4 \cdot 6H_2O$, $Mn_3(C_6H_5O_7)_2$, $MnS_2O_6$, $Mn(C_6H_{11}O_7)_2 \cdot 2H_2O$, $CH_2OHCHOHCH_2OP(O)O_2Mn$, $Mn(H_2PO_2) \cdot H_2O$, $Mn(C_3H_5O_3)_2 \cdot 3H_2O$, $MnBr_2$, $MnCl_2$, $MnCl_2 \cdot 4H_2O$, $Mn(IO_3)_2$; $Mn(NO_3)_2 \cdot 6H_2O$, $MnSO_4 \cdot 5H_2O$, $Mn_2O_7$ | 1)*Formaldioxime hydrochloride; 2)a)*Periodate; b)*Periodate + tetrabase; 3)Alkali hydroxide + benzidine; 4)*Ammoniacal silver nitrate 5)Sodium perxenate(solid) 6)Benzidine 7)*Tollens reagent 8)Lead dioxide | 1)orange-red 2)a)violet b)blue 3)blue 4)black 5)violet to pink 6)blue 7)black 8)violet |
| Iron (#26) | Ferric ammonium citrate, $(NH_4)_3Fe(C_2O_4)_3 \cdot 3H_2O$, $FeNH_4(SO_4)_2 \cdot 12H_2O$, ferric ammonium tartrate, $FeF_3$, $FeBr_2$, $FeCl_2$, $FeCl_3$, $Fe(ClO_4)_2$, $Fe[(CH_3)_2AsO_2]_3$, $FeC_6H_5O_7 \cdot 2H_2O$, $Fe_2(Cr_2O_7)_3$, $Fe[C_3H_5(OH)_2PO_4]_3 \cdot xH_2O$, $Fe_2(C_4H_4O_5)_2$, $Fe(NO_3)_2$, $Fe(NO_3)_3 \cdot 9H_2O$, $FeSO_4$, $Fe_2(C_2O_4)_3$, ferric potassium citrate, ferric pyrophosphate soluble (A combination of ferric pyrophosphate $(Fe_4(P_2O_7)_3 \cdot xH_2O)$ and sodium citrate). | 1)*8-hydroxyquinoline-7-iodo-5-sulfonic acid; 2)Potassium ferrocyanide; 3)Alpha,alpha'-Dipyridyl; 4)Potassium thiocyanate; 5)Dimethylglyoxime 6)*Sodium dimethylglyoxime 7)*Disodium-1,2-dihydroxybenzene-3,5-disulfonate; 8)*Thioglycolic acid; 9)*Quercitrin; 10)*2-Nitroso-1-naphthol-4 sulfonic acid. 11)*Sodium Phosphate; 12)Bathophenanthroline; 13)* Bathophenanthroline disulfonic acid; 14)Ferene; 15)Chrome Azurol S + *Cetyltrimethylammonium bromide; 16)1,10-Phenanthroline; 17)1,10-Phenanthroline + Bromothymol Blue; 18)*Ferrozine 19)Isonitrosobenzoylmethane 20)Phenyl 2-pyridyl ketoxime 21)Pyridine-2,4,6-tricarboxylic acid 22)5,7-Dibromo-8-hydroxyquinoline 23)Quercetin or quercitin 24)Alpha-Furil monoxime 25)p-Amino-N,N-dimethylaniline 26)o-Phenylenediamine | 1)green 2)prussion blue 3)deep red 4)deep red 5)red 6)red 7)pH <5 deep blue, pH 5.7 to 6.5 violet, pH7red. 8)purple-red 9)olive green 10)green 11)Yellow-white 12)red 13)red 14)? 15)? 16)red 17)? 18)? 19)blue 20)violet 21)purple 22)green-black 23)olive-green 24)red 25)rose 26)yellow to red |
| Cobalt (#27) | $Co(C_2H_3O_2)_2 \cdot 4H_2O$, $CoSO_4 \cdot (NH_4)_2SO_4 \cdot 6H_2O$, $CoBr_2 \cdot 6H_2O$, $CoCl_2$, $CoCl_2 \cdot 6H_2O$, $Co(ClO_4)_2$, $CoF_2$, $Co(CHO_2)_2 \cdot 2H_2O$, $CoI_2 \cdot 6H_2O$, $Co(NO_2)_2$, $Co(NO_3)_2$, $CoSiF_6 \cdot 6H_2O$, $CoSO_4$, $CoSO_4 \cdot 7H_2O$, $K_3Co(NO_2)_6$, $Co(SCN)_2$ | 1)Alpha-nitroso-beta-naphthol; 2)Beta-Nitroso-alpha-naphthol; 3)Rubeanic acid; 4)*Ammonium Thiocyanate and acetone; 5)*2-Nitroso-1-naphthol-4-sulfonic acid. 6)*Nitroso R salt; 7)4-(2-Pyridylazo)resorcinol; 8)4-(2-Pyridylazo)resorcinol + Diphenylguanidine; 9)*Sodium thiosulfate 10)Chromotropic acid dioxime 11)*Sodium | 1)red-brown 2)red-brown 3)yellow-brown 4)deep blue 5)red 6)red 7)? 8)? 9)blue 10)blue 11)greenish- |

TABLE 3-continued

| Transition Element | Water Soluble Salts | PRECIPITANTS. Inorganic precipitants *water soluble | Color of Product |
|---|---|---|---|
| | | pentacyanopiperidine ferrate 12)*Hydrogen peroxide and *sodium bicarbonate 13)*Mangabous sulfate & butyraldehyde 14)*Sodium azide & o-tolidine 15)Diacetylmonoxime p-nitrophenyl-hydrozone 16)3-Hydroxyiminopentane-2-one p-nitrophenylhydrozone 17)Ammonium hypophosphite melt | blue 12)green 13)brown 14)blue 15)violet or purple 16)red 17)blue |
| Nickel (#28) | $Ni(OOCCH_3)_2 \cdot 4H_2O$, $NiF_2$, $NiCl_2 \cdot NH_4Cl$, $Ni(ClO_4)_2$, $NiCl_2 \cdot NH_4Cl \cdot 4H_2O$, $NiBr_2$, $NiBr_2 \cdot 3H_2O$, $NiCl_2$, $NiCl_2 \cdot 6H_2O$, $NiI_2$, $(HCOO)_2Ni \cdot 2H_2O$, $Ni(NO_3)_2 \cdot 6H_2O$, $Ni(NO_3)2$, $Ni(NO_3)_2 \cdot 4NH_3 \cdot 2H_2O$, $NiSO_4 \cdot K_2SO_4 \cdot 6H_2O$, $NiSO_4 \cdot 6H_2O$, $NiSO_4 \cdot 7H_2O$; $Ni(SCN)_2$ | 1)Dimethylglyoxime; 2)*Sodium Dimethylglyoxime; 3)Dimethylglyoxime and bromine water; 4)Rubeanic Acid (dithiooxamid); 5)2,2'-Furildioxime; 6)2-(5-Bromo-2-pyridylazo)-diethylaminophenol; 7)2-(2-Pyridylazo)-2-naphthol; 8)4-(2-Pyridylazo)resorcinol; 9)*4-(2-Pyridylazo)resorcinol sodium salt; 10)Quioxaline-2.3-dithiol | 1)Red ppt. 2)Red ppt; 3)Red to orange 4)blue to blue violet; 5)? 6)? 7)? 8)? 9)? 10)red |
| Copper (#29) | $Cu(C_2H_3O_2)_2 \cdot H_2O$, $CuBr_2$, $CuCl_2$, $CuCl_2 \cdot 2H_2O$, $Cu(ClO_4)_2$, $CuCr_2O_7 \cdot 2H_2O$, $CuSiF_6 \cdot 4H_2O$, $[CH_2OH(CHOH)_4COO]_2Cu$, $Cu(C_3H_5O_3)_2 \cdot 2H_2O$, $Cu(NO_3)_2 \cdot 3H_2O$, $Cu(NO_3)_2 \cdot 6H_2O$, $[C_6H_4(OH)SO_3]_2Cu \cdot 6H_2O$, $CuCl_2 \cdot 2NaCl \cdot 2H_2O$, $CuSO_4 \cdot 5H_2O$, $Cu(NH_3)_4SO_4 \cdot H_2O$, $CuSeO_4$ | 1)Benzoin oxime 2)* 4)Salicylaldoxime; 3)o-Tolidene and *ammonium thiocyanate; 4)*Phosphomolybdic acid; 5)*1,2-Diaminoanthraquinone sulfonic acid; 6)Rubeanic acid; 7)Dithizone; 8)Benzidine + *potassium bromide; 9)p-Dimethylaminorhodanine; 10)8-hydroxyquinolline + *potassium cyanide; 11)*Ammonium mercury thiocyanate + *zinc salts; 12)*Hydrobromic acid; 13)*2-Nitroso-1-naphthol-4-sulfonic acid. 14)Phennetidine + hydrogen peroxide; 15)Diphenylcarbazone; 16)Di-m-nitrophenylcarbazone; 17)Bathocuproine; 18)* Bathocuproine disulfonic acid; 19)Neocuprine; 20)Cuprizone 21)*Potassium ferrocyanide 22)Zinc ferrocyanide 23)*Sodium diethyldithiocarbamate 24)Zinc diethyldithiocarbamate 25)2,2'-Biquinoyl (Cuproin) 26)*Catalysis of the ferric-thiosulfate reaction 27)p-Phenylenediamine & *ammonium thiocyanate(on Dowex 50-X or 1% DVB) 28)Alizarin Blue 29)*Ammonium bromide & *Concentrated Phosphoric acid 30)Alkali tartrate, *hydrogen | 1)green 2)yellow-green 3)light to dark blue 4)deep blue 5)blue 6)black 7)yellow-brown 8)blue 9)red 10)red 11)violet 12)violet to brown. 13)orange(pH 7-8) 14)violet 15)violet 16)violet 17)? 18)? 19)? 20)? 21)brick red 22)brick red 23)brown 24)brown-yellow 25)purple-red 26)deep violet 27)black 28)cornflower-blue 29)violet 30)indigo blue |

TABLE 3-continued

| Transition Element | Water Soluble Salts | PRECIPITANTS. Inorganic precipitants *water soluble | Color of Product |
|---|---|---|---|
| | | peroxide & o-hydroxyphenylfluorone | |
| | | 31)Catalysis of the autoxidation of resorcinol | 31)brown |
| | | 32)Benzamiidoxime | 32)green |
| | | 33)Acetylene | 33)intense red |
| | | 34)Lumocupferron | 34)green fluorexcence |
| | | 35)Potassium guaiacol-o-sulfate | 35)greenish-yellow |
| | | 36)8,8'-Diquinolyldisulfide | 36)? |
| Zinc (#30) | $Zn(C_2H_3O_2)_2 \cdot 2H_2O$, $ZnF_2$, $ZnCl_2 \cdot 2NH_4Cl$, ZnO 45% $B_2O_3$ 34% may have 20% water of hydration, $Zn(BrO_3)_2 \cdot 6H_2O$, $ZnBr_2$, $Zn(ClO_3)_2 \cdot 4H_2O$, $ZnCl_2$, $Zn(ClO_4)_2$, Zinc chloroiodide (A mixture of chloride and iodide), $Zn(C_2H_5SO_4)_2 \cdot 2H_2O$, $ZnSiF_6 \cdot 6H_2O$, $Zn(HSO_2 \cdot CH_2O)_2$ (normal), $Zn(CHO_2)_2 \cdot 2H_2O$, Zinc gluconate, $C_3H_5(OH)_2OPO_3Zn$, $ZnS_2O_4$, $Zn(OH)_2$, $Zn(H_2PO_2)_2 \cdot H_2O$, $ZnI_2$, $Zn(IO_3)_2$, $Zn(C_3H_5O_3)_2 \cdot 3H_2O$, $Zn(OOCCH_2CHOHCOO) \cdot 3H_2O$, $Zn(NO_3)_2 \cdot 6H_2O$, $Zn(MnO_4)_2 \cdot 6H_2O$, $Zn(SO_3C_6H_4OH)_2 \cdot 8H_2O$, $Zn(OOC_2H_5)_2$, $Zn[C_6H_4(OH)COO]_2 \cdot 3H_2O$, $ZnSO_4 \cdot 7H_2O$, $ZnSO_4 \cdot H2O$, $Zn(CNS)_2$, "Calgon composition TG"(a glassy composition of sodium zinc hexametaphosphate). $ZnSeO_4$ | 1)*Potassium ferricyanide and diethyl aniline; 2)Dithizone 3)*Potassium ferricyanide + p-phenetidine; 4)Uranyl ferrocyanide; 5)Resorcinol. 6)1-(2-Pyridylazo)-2-naphthol 7)*Xylenol Orange 8)Zircon 9)*Potassium ferricyanide and 3.3'-dimethylnaphthidine 10)Induced precipitation of Co[Hg(CN)4} 11)Trisodium pentacyano-p-nitroso-dimethylanilino-ferrate(II) 12)*Potassium cobalticyanide 13)Vanillinazin 14)*Potassiumferricyanide and methylene blue 15)*Potassiumferrocyanide, *thiourea, and Rhodamine B 16)*Potassiumferrocyanide and methyl violet 17)4-aminobenzenethiol 18)*Potassiumferrocyanide, *potassium iodide and starch | 1)yellow to brownish red 2)purple-red 3)blue 4)white on brown 5)blue 6)? 7)? 8)? 9)dark red-brown 10)blue 11)pale green to blue 12)green 13)dark red 14)blue 15)violet 16)yellow 17)rose 18)deep blue |
| Fifth Row | | | |
| Ytrium (#39) | $Y(C_2H_3O_2)_3 \cdot 8H_2O$, $YBr_3 \cdot 9H_2O$, $YCl_3 \cdot 6H_2O$, $Y(NO_3)_3$ | 1)*Alizarin Red S; 2)Arsenzo III; 3)*Xylenol Orange. 4)Catechol and organic bases 5)Complex of catechol violet with *boric acid | 1)? 2)? 3)? 4)white 5)blue |
| Zirconium (#40) | $H_2ZrO_2(C_2H_3O_2)_2$ available as 22% and 13% $ZrO_2$ aqueous solutions, $Zr(NH_4)_2F_6$, $H_4ZrO(CH_3CHOCO_2)_3$, $Zr(NO_3)_4 \cdot 5H_2O$, $ZrOCl_2$, $8H_2O$, $ZrK_2F_6$ (hot), $Zr(SO_4)_2 \cdot 4H_2O$, $ZrOOHCl \cdot nH_2O$, $ZrO(OH)NO_3$. | 1)2-Nitroso-1-naphthol; 2)1-Nitroso-2-naphthol; 3)Alizarin; 4)p-Dimethylaminoazophenylarsonic acid; 5)a)*Carminic acid [or} b)gallocyanine]; 6)5-Chlorobromoamine acid; 7)*Alizarin Red S; 8)Arsenazo III; 9)*Xylenol Orange. 10)m-(2-Hydroxynaphthalene-1-azo)-mandelic acid | 1)green-yellow 2)red 3)red brown to dark violet 4)brown 5)a)yellow to red, b)pink to blue 6)red 7)? 8)? 9)? 10)pink |
| Niobium (#41) | $NbO(HC_2O_4)_3 \cdot 4H_2O$, $K_2NbOF_5 \cdot H_2O$. | 1)N-Benzoyl-N-phenylhyroxylamine; 2)*Pyrocatechol + EDTA; | 1)? 2)? |

TABLE 3-continued

| Transition Element | Water Soluble Salts | PRECIPITANTS. Inorganic precipitants *water soluble | Color of Product |
|---|---|---|---|
| | | 3)2,2'-Bipyridil; | 3)? |
| | | 4)1-(2-thenoyl)-3.3.3-trifluoroacetone; | 4)? |
| | | 5)Bromopyrogallol red; | 5)? |
| | | 6)Bromopyrogallol red + Cetylpyridinium chloride; | 6)? |
| | | 7)4-(2-Pyridylazo)resorcinol; | 7)? |
| | | 8)Sulfochlorophenol S; | 8)? |
| | | 9)*Xylenol Orange. | 9)? |
| | | 10)*Pyrpgallol-4-sulfonic acid | 10)orange-orange red |
| | | 11)Ammonium hypoohosphite melt | 11)black |
| | | 12)*Zinc chloride | 12)blue-black |
| Molybdenum (#42) | $H_4SiMo_{12}O_{40} \cdot xH_2O$ $x$ = usually 6-8, Heteromolybdates such as Na3PMo12O40 (can contain phosphorous, arsenic, iron, and tellurium as hetero atoms and any of 35 elements can be present. The acids and most of the salts are very soluble, Na2MoO2, Na4SiMo12O40, MFP. | 1)Phenylfluorone; | 1)? |
| | | 2)Bromopyrogallol Red + Cetylpyridinium chloride; | 2)? |
| | | 3)Toluene-3,4-dithiol, | 3)? |
| | | 4)*Potassium thiocyanate + stannous chloride; | 4)brick red |
| | | 5)*Potassium xanthate; | 5)pink to violet |
| | | 6)Zinc or *cadmium xanthate; | 6)red |
| | | 7)Phenylhydrazine; | 7)blood red |
| | | 8)Tincture of cochineal; | 8)Flame red fluorescence (pH 5.7-6.2) |
| | | 9)Alpha,alpha'-Dipyridil + *stannous chloride; | 9)violet |
| | | 10)Diphenylcarbazide; | 10)violet |
| | | 11)Di-beta-naphthylcarbazone | 11)violet |
| | | 12)*Potassium ethyl xanthate | 12)deep red-blue |
| | | 13)Zinc ethyl xanthate | 13)deep red-blue |
| | | 14)Methylene blue and hydrazine | 14)Fading of blue |
| | | 15)o-Hydroxyphenylf; uorone | 15)carmine |
| | | 16)Morin and butanol | 16)brown |
| | | 17)Ammonium hypophosphite melt | 17)red-brown |
| Ruthenium (#44) | $Ru_2(OH)_2Cl_4 \cdot 7NH_3 \cdot 3H_2O$, $RuCl_3$. | 1)1,10-Phenanthroline; | 1)? |
| | | 2)*Thiourea; | 2)? |
| | | 3)1,4-Diphenylthiosemicarbazide; | 3)? |
| | | 4)*Potassium chlorate + potassium iodide (+starch); | 4)blue black |
| | | 5)Rubeanic acid; | 5)blue |
| | | 6)Benzidene; | 6)blue or green |
| | | 7)*Potassium ferrocyanide. | 7)blue or green |
| Rhodium (#45) | $RhCl_3$(if hydrated), $Rh(NO_3)_2 \cdot 2H_2O$, $Rh(SO_4)_2 \cdot 12H_2O$, | 1)1-(2-Pyridylazo)-2-naphthol | 1)? |
| | | 2)*Stannous chloride + *ammonium chloride and *potassium iodide | 2)cherry red |
| Palladium (#46) | $PdCl_2$, $PdCl_2 \cdot 2H_2O$, $Pd(NO_3)_2$, $PdCl_2 \cdot 2KCl$, $PdCl_2 \cdot 2NaCl$, | 1)*Mercuric cyanide + *Stannous chloride. | 1)orange-red to yellow gold |
| | | 2)Nickel dimethylgloxime; | 2)pink to red |
| | | 3)Naphthalene-4'-sulfonic acid-1-azo-5-o-8-hydroxyquinoline; | 3)orange-yellow |
| | | 4)p-Dimethylaminobenzylidene rhodanine; | 4)red-violet |
| | | 5)Diphenylcarbazide and *mercuric cyanide; | 5)violet |
| | | 6)2-(5bromo-2-pyridylazo)-5-diethylaminophenol; | 6)? |
| | | 7)Dithizone; | 7)? |
| | | 8)2-Nitroso-1-Napthol; | 8)? |
| | | 9)4-(2-Pyridilazo)resorcinol | 9)? |
| | | 10)*Mercuric iodide | 10)black or grey |
| | | 11)p-Nitrosophenylamine | 11)red or purplish brown |
| | | 12)Phenooxithine | 12)yellow to red brown |
| | | 13)3-Hydroxy-3-phenyl-1-sulfo-phenyltriazene | 13)? |
| | | 14)Mercaptobenzoindazole | 14)orange |

TABLE 3-continued

| Transition Element | Water Soluble Salts | PRECIPITANTS. Inorganic precipitants *water soluble | Color of Product |
|---|---|---|---|
| | | 15)*Mercuric cyanide and methyl yellow | 15)red |
| | | 16)Parafuchsin | 16)brown |
| | | 17)Alpha-nitroso-beta-naphthol | 17)dark-brown |
| | | 18)Potassium ferrocyanide and alpha-alpha'-dipyridyl | 18)red |
| | | 19)Triphenylstilbene | 19)pink to red |
| | | 20)Voluric acid | 20)yellow-brown |
| | | 21)Ammonium molybdate and sodium hypophosphate | 21)blue |
| Silver (#47) | AgF•$H_2O$, $AgNO_2$, $AgNO_3$, $KAg(CN)_2$, $Ag_2S_2O_3$•$2Na_2S_2O_3$•$2H_2O$, $Ag_2SO_4$ (hot), $AgClO_2$, $AgClO_3$, $AgClO_4$, | 1)Dithizone; | 1)violet |
| | | 2)*Eosin + 1,10Phenanthroline; | 2)? |
| | | 3)Methylthymol blue + *Barium (II) (Sulfate) | 3)? |
| | | 4)N,N,-Dimethyl-1,4-phenylenediamine (Sulfide); | 4)? |
| | | 5)Pararosaniline + *Formaldehyde (Sulfite); | 5)? |
| | | 6)*Manganese Nitrate and alkali; | 6)black |
| | | 7)p-Dimethylaminobenzylidene rhodanine; | 7)red violet |
| | | 8)*Potassium Chromate; | 8)red |
| | | 9)*Stannous chloride and chromotropic acid; | 9)black |
| | | 10)*Stannous Chloride | 10)free silver |
| | | 11)*Sodium selenosulfate | 11)brown |
| | | 12)*Persulfate and pyridine | 12)yellow |
| | | 13)1,10-Phenanthroline and bromo-pyrogallol red | 13)blue |
| | | 14)*Cuprous thiocyanate | 14)smoke-brown |
| | | 15)p-Dimethylaminobenzylidenethio-barbituric acid | 15)red violet |
| | | 16)Ethylenediaminetetraacetic acid + *FeSo4 + *sodium acetate | 16)black or grey |
| | | 17)Potassium ferrocyanide and alpha,alpha'-dipyridyl | 17)red |
| | | 18)Potassium nickel cyanide and dimethylglyoxime | 18)red |
| Cadmium (#48) | $Cd(OOCCH_3)_2$•$3H_2O$, $CdF_2$, $CdBr_2$•$4NH_4Br$, $Cd_5(BW_{12}O_{40})$•$18H_2O$, $CdBr_2$, $CdBr_2$•$4H_2O$, $Cd(ClO_3)_2$•$2H_2O$, $CdCl$, $CdCL_2$•$2.5H_2O$, $Cd(ClO_4)_2$, $CdI_2$(alpha), $Cd(NO_3)_2$•$4H_2O$, $Cd(NO_3)_2$, $CdI_2$•$2KI$•$2H_2O$, $CdSO_4$, $3CdSO_4$•$8H_2O$, $CdSO_4$•$4H_2O$, $CdSeO_4$ | 1)Dithizone; | 1)? |
| | | 2)Cadion; | 2)? |
| | | 3)2-(5-Bromo-2-pyridylazo)-5-diethylaminophenol; | 3)? |
| | | 4)4-(2-Pyridylazo)rersorcinol; | 4)? |
| | | 5)Di-p-nitrophenylcarbazide: | 5)green-blue |
| | | 6)Ferrous dipyridyl iodide; | 6)red-violet |
| | | 7)Di-beta-naphthylcarbazone; | 7)red to violet |
| | | 8)Diphenylcarbazide; | 8)violet |
| | | 9)p-Nitrodiazoaminoazo benzene (Cadion 2B) | 9)bright pink |
| | | 10)*Sodium Sulfide | 10)yellow |
| | | 11)Zinc Sulfide | 11)yellow |
| | | 12)Glyoxal bis-(2-hydroxyanil) | 12)blue |
| | | 13)*Cyanide and *sodium sulfite | 13)yellow |
| | | 14)Bis-(p-ethylbenzylaminophenyl)-antipyrinyl-methanol | 14)intense crimson |
| | | 15)Dithizone and cyclohexanone | 15)orange |
| Sixth Row | | | |
| Lanthanum (#57) | $La(C_2H_3O_2)_3$•$xH_2O$, $La(NO_3)_3 \times 2NH_4NO_3 \times 4H_2O$, $LaCl_3$•$7H_2O$, $La(NO_3)_3$•$6H_2O$. | 1)Arsenzo III. | 1)? |
| | | 2)Acid Monochrome Bordeaux S | 2)orange |
| Hafnium (#72) | $HfOCl_2$•$8H_2O$, $K_2HfF_6$, $HfBr_4$, $HfCl_4$. | 1)Arsenzo III. | 1)? |
| | | 2)Arsenzo I | 2)red-violet |
| | | 3)Quercetin and *perchloric acid | 3)green fluorescence (UV) |
| Tantalum (#73) | $Na_8Ta_6O_{19}$•$25H_2O$, $K_2TaF_7$(hot). | 1)*Methyl Violet; | 1)? |
| | | 2)4-(2-Pyridylazo)resorcinol; | 2)? |
| | | 3)Phenylfluorone | 3)? |
| | | 4)Catechol violet | 4)blue-violet |

TABLE 3-continued

| Transition Element | Water Soluble Salts | PRECIPITANTS. Inorganic precipitants *water soluble | Color of Product |
|---|---|---|---|
| | | 5)*Pyrogallol-4-sulfonic acid and *oxalic acid | 5)yellow |
| Tungsten (#74) | See Hetromolybdates for heterotungstates, especially phosphotungstates such as $H_3PW_{12}O_{40} \cdot xH_2O$, $Na_2WO_4 \cdot 2H_2O$, $WCl_5$, $WBr_5$, $(NH_4)_6W_7O_{24} \cdot 6H_2O$, $K_2WO_4 \cdot 2H_2O$, $2(NH_4)_3PO_4 \cdot 24WO_3 \cdot xH_2O$, $(NH_4)_6H_2W_{12}O_{40} \cdot xH_2O$ | 1)*Pyrocatechol Violet; 2)*Tetraphenylarsonium chloride + *Thiocyanate; 3)Toluene 3,5-dithiol; 4)*Stannous chloride; 5)Diphenylene. 6)8-Hydroxyquinoline 7)Ammonium hypophosphite melt | 1)? 2)? 3)? 4)blue 5)white ppt. 6)orange yellow 7)blue |
| Rhenium (#75) | $Re_2O_7$, $ReCl_3$, $ReO_3$, $NaReO_4$. | 1)2.2'-Furildioxime. 2)*Tris(alpha,alpha'-dipyridyl)-iron(II)sulfate | 1)? 2)red |
| Osmium (#76) | $OsO_4$, $(NH_4)_2OsCl_6$. | 1)1.5-Diphenylcarbazide; 2)*Potassium chlorate + potassium iodide + starch; 3)*Benzidene acetate; 4)Potassium ferrocyanide. 5)3.3'-Dimethylnapthidine 6)Apomorhine 7)p-Phenylenediamine | 1)? 2)blue 3)blue or green 4)blue or green 5)red 6)brownish-red 7)violet-red |
| Iridium (#77) | $IrCl_2$, $IrCl \cdot xH_2o$, $IrCl_4 \cdot 2NH_4Cl$, $Ir_3 \cdot 3NH_4Cl$, $Ir_2(SO_4) \cdot 3(NH_4)_2SO_4 \cdot 24H_2O$, $IrCl_4$, $IrBr_3 \cdot 4H_2O$, $K_2IrCl_6$. | 1)Rhodamine 6G + Tin(II); 2)N,N-Dimethyl-4-nitrosoaniline. 3)a)Alizarin or b)Quinalizarin 4)Benzidine | 1)? 2)red 3)a)dark red, b)violet 4)blue |
| Platinum (#78) | $(NH_4)_2PtCl_6$, $H_2PtCl_6 \cdot 6H_2O$, $BaPt(CN)_4 \cdot 4H_2O$, $PtCl_4$, $PtCl_4 \cdot 5H_2O$, $PtCl_4 \cdot 8H_2O$, $Na_2PtCl_4 \cdot 4H_2O$ $Na_2PtCl_6 \cdot 6H_2O$, $Pt(SO_4)_2 \cdot 4H_2O$, $PtI_4$. | 1)Dithizone; 2)2-Mercaptobenzothiazole; 3)Sulfochlorophenolazorhodamine 4)*Thallium nitrate* + *Stannous chloride. 5)*Alkali iodide 6)1.4.-Diphenyl-3-thiosemicarbazide | 1)? 2)? 3)? 4)yellow to orange red 5)brown 6)green |
| Gold (#79) | $Au(CN)_3 3H_2O$, $HAu(CN)_4 \cdot 3H_2O$, $NaOOCCH(SAu)CH_2COONa \cdot H_2$, $AuCl_3$, $AuCl_3 \cdot 2H_2O$, $AuCL_2 \cdot HCl \cdot 4H_2O$, $HAuCl_4 \cdot 4H_2O$, $NaAuCl_4 \cdot 2H_2O$, $NaAu(CN)_2$, $AuBr_3$, $HAuBr_4 \cdot 5H_2O$, $Au_2O_3 \cdot 2SO_3 \cdot H_2O$, $HAu(NO_3)_4 \cdot 3H_2O$. | 1)*Rhodamine B; 2)5-(4-Diethylaminobenzylidene) rhodanine; 3)Benzidene. 4)Alpha-Naphthylamine and butanol 5)N,N'-di-2-naphthyl-p-phenylene-diamine | 1)red-violet 2)red-violet 3)blue 4)violet 5)red-brown |
| Mercury (#80) | $Hg(C_2H_2O_2)_2$, $HgCl_2 \cdot 2NH_4Cl \cdot 2H_2O$, $HgBr_2 \cdot BaBr_2$, $HgI_2 \cdot BaI_2 \cdot 5H_2O$, $HgCl_2$, $Hg(CN)_2$, $HgF_2$, $Hg(C_3H_5O_3)_2$, $Hg(NO_3)_2 \cdot 2H_2O$, $Hg(NO_3)_2 \cdot \frac{1}{2}H_2O$, $HgO \cdot Hg(CN)_2$, $Hg(CN)_2 \cdot 2KCN$, $K_2HgI_4$ or $2KI \cdot HgI_2$, "merbromin"$C_{20}H_8Br_2$ $HgNa_2O_6$, mercurol (contains 20% mercury), $Hg_2(ClO_3)_2$, $HgSO_4$ | 1)Diphenylcarbazone); 2)*Xylenol Orange; 3)Michler's thioketone; 4)*Stannous chloride and aniline; 5)p-Dimethylaminobenzylidene rhodanine; 6)*Copper(I) iodide; 7)*Chromotropic acid. 8)Dithizone 9)Potassium ferrocyanide + nitrosobenzene or other nitrosos 10)Chromotropic Acid 11)Potassium ferrocyanide and alpha,alpha'-dipyridyl 12)Glyoxal bis-(2-mercaptoanil) 13)Ammonium sulfide | 1)blue or violet 2)? 3)? 4)grey or black 5)violet 6) 7)brown or yellow 8)orange 9)violet 10)brown or yellow 11)red 12)dark red to pale pink 13)? |

Table 4 represents metals, corresponding water soluble salts, resultant inorganic precipitants, and color of the precipitant.

TABLE 4

| Metals | Water Soluble Salts | PRECIPITANTS. Inorganic precipitants *water soluble | Color of Product |
|---|---|---|---|
| Aluminum (#13) | Al(ClO$_3$)$_2$•6H$_2$O; Al(ClO$_4$)$_3$; AlF$_3$; AlCl$_3$; AlI$_3$; Al(NO$_2$)$_3$•9H$_2$O; Al(NO$_3$)$_3$; Al$_2$(SO$_4$)$_3$; AlNH$_4$(SO$_4$)$_2$•12H$_2$O; AlTl(SO$_4$)$_2$•12H$_2$O; AlK(SO$_4$)$_2$•12H$_2$O. | 1)*Alizarin Red S; 2)*Aluminon; 3)*Aluminon + *Cetyltrimethyl-ammonium bromide; 4)Chrome Azurol S; 5)Chrome Azurol S + *Cetyltrimethyl-ammonium bromide; 6)Chromazol KS + *Cetylpyridinium bromide; 7)*Eriochrome Cyanin R; 8)*Eriochrome Cyanin R + *Cetyltrimethylammonium bromide; 9)8-Hydroxyquinoline; 10)Morin and Morin under U.V. light; 11)Alizarin sulfonic acid; 12)Alizarin; 13)Qunalizarin; 14)Pontachrome blue black R; 15)*Ammonium aurin tricarboxylate ("Aluminon") 16)Tannin 17)Chrome Fast Pure Blue B 18)Salicylidene-o-aminophenol 19)Glyoxal bis-(2-hydroxyanil) | 1)red 2)red lake 3)red 4)blue 5)orange 6)violet 7)violet 8)violet 9)yellow-green fluorescence 10)intense green fluorescence 11)red 12)deep violet 13)red to red-violet 14)orange-red fluorescence 15)red lake 16)? 17)magenta or pink 18)yellow-greenish fluorescence 19)red |
| Gallium (#31) | GaCl$_2$; GaCl$_3$;GaBr$_3$. | 1)*Pyrocatechol violet + Diphenylguanidine; 2)8-Hydroxyquinoline; 3)1-(2-Pyridylazo)-2-naphthol; 4)4-(2-Pyridylazo)resorcinol; 5)Rhodamine B; 6)*Xylenol Orange; 7))*Xylenol Orange; + 8-Hydroxyquinoline; 8)*Potassium ferrocyanide and *manganese chloride 9)Salicylidene-o-aminophenol + *NaBF$_4$ 10)Rhodamine S 11)*Gallion 12)Lumogallion 13)Eriochrome Red B | 1)? 2)? 3)? 4)? 5)? 6)? 7)? 8)red-brown 9)yellow fluorescence (UV) 10)fluorescence (UV) 11)blue fluorescence (UV) 12)orange fluorescence (UV) 13)blue fluorescence (UV) |
| Germanium #(31) | GeF$_4$•2H$_2$O | 1)Brilliant Green + *Molybdate; 2)Phenylfluorone; 3)*Ammonium molybdate and benzidene; 4)Hydroxyanthroquinone 5)9-Phenyl-2,3,7-trihydroxy-6-fluorone 6)Haematoxylin and anion exchange resin(Amberlite | 1) 2) 3)blue 4)a)yellowish-red, b)orange-wine red c)violet-blue 5)pink 6)violet to black |

TABLE 4-continued

| Metals | Water Soluble Salts | PRECIPITANTS. Inorganic precipitants *water soluble | Color of Product |
|---|---|---|---|
| | | IRA-411) | |
| | | 7)Diphenylcarbazone | 7)purple |
| | | 8)*Ammonium molybdate and *hydoxylamine hydrochloride | 8)evanescent blue-green |
| Indium (#49) | InCl$_3$; InI$_3$; In$_2$(SO$_4$)$_3$ | 1)Bromopyrogallol Red; | 1)? |
| | | 2)Chrome Azurol S; | 2)? |
| | | 3)Chrome Azurol S + Cetyltrimethylammonium bromide | 3)? |
| | | 4)Dithizone | 4)? |
| | | 5)8-Hydroxyquinoline | 5)? |
| | | 6)1-(2-Pyridylazo)-2-naphthol | 6)? |
| | | 7)4-(2-Pyridylazo)resorcinol; | 7)? |
| | | 8)Alizarin | 8)dark red |
| | | 9)Quinalizarin | 9)violet |
| Tin (#50) | H$_2$SnCl$_6$•6H$_2$O; SnBr$_2$; SnCl$_2$; •2H$_2$O; SnSO$_4$; Sn(SO$_4$)$_2$•2H$_2$O. | 1)*Pyrocatechol violet | 1)? |
| | | 2)*Pyrocatechol violet + *Cetyltromethylammonium bromide | 2)? |
| | | 3)Gallein | 3)? |
| | | 4)Phenylfluorone | 4)? |
| | | 5)Toluene-3,4-dithiol + Dispersant | 5)? |
| | | 6)*Mercuric Chloride and aniline | 6)brown |
| | | 7)Cacotheline | 7)violet |
| | | 8)Dimethylglyoxime and *ferric salts | 8)red to clear |
| | | 9)*Sodium Dimethylglyoxime and *ferric salts | 9)red to clear |
| | | 10)Diazine green | 10)violet to red |
| | | 11)2-Benzyl pyridine | 11)red |
| | | 12)*Ammonium phosphomolybdate | 12)yellow to deep blue |
| | | 13)1,2,7-Trihydroxyanthroquinone | 13)orange |
| | | 14)*Anthroquinone-1-azo-4-dimethylaniline hydrochloride | 14)blue-violet |
| | | 15)*Ferric ferricyanide | 15)blue |
| | | 16)Ammonium sulfotellurate | 16)black |
| | | 17)Dithiol | 17)red |
| | | 18)Ammonium phosphomolybdate | 18)blue |
| | | 19)Morin | 19)yellow-green fluorescence |
| | | 20)*Nitronaphthol sulfonic acid | 20)blue fluorescence |
| | | 21)Mercuric chloride and aniline | 21)brown |
| | | 22)Oxidation products of o-aminophenols | 22)geen to blue-geen |
| | | 23)*Phosphomolybdic acid and ammonium acetate | 23)blue |
| | | 24)Glyoxal bis-2-hydroxyanil | 24)blue |
| | | 25)*Sodium rhodizonate | 25)violet |
| Antimony (#51) | SbBr$_3$; SbCl$_3$; SbF$_3$; (SbO)KC$_4$H$_4$O$_6$•½H$_2$O | 1)Brilliant green | 1)? |
| | | 2)*Brompyrogallol Red | 2)? |
| | | 3)*Silver diethyldithiocarbamate | 3)? |
| | | 4)*Rhodamine B | 4)violet or blue |
| | | 5)*Phosphomolybdic acid | 5)blue |
| | | 6)9-Methyl-2,3,7-trihydoxyfluorone | 6)red |
| | | 7)*Ammonium sulfotellurate | 7)black |
| | | 8)*Mercuric cyanide | 8)black or gray |
| | | 9)*Phosphomolybdic acid | 9)blue |
| | | 10)9-methyl-2,3,7-trihydroxy-6-fluorone | 10)red |
| | | 11)Gallein | 11)violet |
| | | 12)Morin | 12)blue green fluorescence (UV) |
| Thallium (#81) | TlOH; TlCO$_2$; TlClO$_4$; TlF; TlNO$_3$; (NH$_4$)$_3$Tl6•2H$_2$O; TlP$_2$O$_7$; Tl$_2$SO$_4$ | 1)Brilliant green | 1)? |
| | | 2)Dithizone | 2)? |
| | | 3)*Rhodamine B | 3)? |
| | | 4)*Potassium Iodide | 4)bright yellow |
| | | 5)Benzidene | 5)blue |
| | | 6)*Phosphomolybdic acid + *hydrobromic acid | 6)blue |
| | | 7)*Dipycryl amine (or *sodium | 7)red |

TABLE 4-continued

| Metals | Water Soluble Salts | PRECIPITANTS. Inorganic precipitants *water soluble | Color of Product |
|---|---|---|---|
| | | salt)<br>8)*Ammonium sulfide<br>9)*Sodium sulfotellurate<br>10)*Oxidation to trivalent thallium in acid solution<br>11)*Sodium carbonate and ammonium sulfide<br>12)*Gold chloride and palladium chloride<br>13)*Alkaline ferricyanide<br>14)*Uranyl sulfate<br>15)8-Hydroxyquinoline | 8)black-brown<br>9)brown<br>10)blue<br><br>11)black-brown<br><br>12)cinnamon-brown<br>13)blue-green<br>14)fluorescence fade<br>15)? |
| Lead (#82) | $Pb(C_2H_3O_2)_2 \cdot 2H_2O$; $PbBr_2$; $PzbCL_2$; $Pb(ClO_4)_2$; $Pb(NO_3)_2$; | 1)Dithizone<br>2)*Sodium Diethyldithiocarbamate<br>3)4-(2-Pyridylazo)resorcinol<br>4)*Sodium rhodizonate<br><br><br>5)*Cadmium-stannous iodide + iodine<br>6)Gallocyanine<br>7)Carminic acid<br>8)Benzidine<br>9)Chloranilic acid | 1)brick red<br>2)?<br><br>3)?<br>4)a)violet(neutral)<br>b)scarlet-red(weak acid<br>5)orange-red<br>6)violet<br>7)violet<br>8)blue<br>9)brown |
| Bismuth (#83) | $Bi(NO_3)_2 \cdot 5H_2O$ in dil. $HNO_3$; $Bi_2(SO_4)_3$ in $H_2SO_4$. | 1)Dithizone<br>2)*Pyrocatechol violet<br>3)*Pyrocatechol violet + Cetyltromethylammonium bromide<br>4)*Thiourea<br>5)*Xylenol Drange<br>6)Cinchonine and *potassium iodide<br>7)*Alklali stannate and *lead salts<br>8)*Potassium chromium thiocyanate<br>9)*Alkali stannite + *lead chloride<br>10)*Potassium manganese (II) cyanide<br>11)Quinoline and *potassium iodide<br>12)*Thioacetamide | 1)?<br>2)?<br>3)?<br><br>4)?<br>5)?<br>6)orange-red<br><br>7)free lead(grey)<br>8)brick red<br><br>9)orange or black-brown<br>10)black<br><br>11)orange-red<br><br>12)yellow-green |

Table 5 represents non-metals, corresponding water soluble salts, resultant inorganic precipitants, and color of the precipitant.

TABLE 5

| Non-Metals | Water Soluble Salts | PRECIPITANTS. Inorganic precipitants *water soluble | Color of Product |
|---|---|---|---|
| Boron (#5) | H2BO3; Borates, Boranes and Borohydrides | 1)*Azomethine H<br>2)*Carminic acid<br>3)*Curcumin<br><br>4)*Methylene Blue<br>5)*Alizarin S<br><br>6)Purpurin(*hot)<br><br>7)Quinalizarin<br>8)Chromotrope 2B<br>9)Benzoin | 1)?<br>2)red to blue<br>3)blue to greenish black<br>4)?<br>5)yellowish red to red<br>6)orange to wine red<br>7)violet to blue<br>8)greenish-blue<br>9)yellow-green |

TABLE 5-continued

| Non-Metals | Water Soluble Salts | | Color of Product |
|---|---|---|---|
| | | 10)*Triphenyltetrazolium chloride | fluorescence 10)red (boranes and borohydrides in soln.) |
| | | TESTS FOR AMMONIA | |
| Nitrogen (as Ammonia) (#7) | $NH_4OH$; $NH_4C_2H_3O_2$; $NH_4H_2AsO_4$; $NH_4AsO_4$; $NHBr$; $(NH_4)_2CO_3 \cdot 2H_2O$; $NH_4HCO_3$; $NH_4Cl$; $NH_4ClO_4$; $(NH_4)_2CrO_4$; $NH_4CNO$; $NH_4CN$; $(NH_4)_2Cr_2O_7$; $NH_4F$; $NH_4I$; $NH_4IO_3$; $(NH_4)_6Mo_7O_{24} \cdot H_2O$; $NH_4NO_2$; $NH_4NO_3$; $(NH_4)_2C_2O_4 \cdot H_2O$; $NH_4MnO_4$; $(NH_4)_2S_2O_8$; $(NH_4)_2PtCl_4$; $(NH_4)_2HPO_4$; $(NH_4)_3PO_4$; $NH_4H_2PO_4$; $(NH_4)_2SO_4$; $(NH_4)_2S$; $(NH_4)_2S_2O_5$; $(NH_4)_2SO_3 \cdot H_2O$; $(NH_4)_2S_2O_3$; $(NH_4)_2SeO_4$; $NH_4SCN$; $(NH_4)_2C_4H_4O_6$ | 1)*Phenol + *Sodium Hypochlorite 2)*pNitrobenzenediazonium chloride 3)*Manganese sulfate-*Hydrogen peroxide + Benzidene 4)Litmus 5)*Manganese sulfate and *silver nitrate 6)8-Hydroxyquinoline and *zinc chloride 7)Formation of indophenol blue 8)*Silver nitrate and tannin 9)Nessler's reagent 10)Formation of manganese dioxide 11)All other tests are for the various water soluble salts of the particular elements involved as indicated in the other tables for that element. | 1)? 2)red 3)blue 4)blue 5)black 6)light yellow 7)blue 8)metallic silver 9)yellow or orange-red 10)blue (with bezidene or tetrabase) 11)See individual elements for the water soluble salts and the ligands and colors produced. |
| Phosphorous (#15) | $HPO_3$; $H_3PO_2$; $H_3PO_3$; $H_3PO_4$; $H_4P_2O_7$; $PH_4I$; $PH_4Cl$. | 1)Rhodamine B + *Molybdate + Benzidene 2)Malachite Green + *Molybdate 3)*Ammonium molybdate and benzidine 4)o-Dianisidine molybdate and *hydrazine 5)Qinolinium molybdate | 1)blue 2)? 3)blue 4)brown to blue 5)yellow |
| Arsenic (#33) | $AsO_3$; $AsBr_3$; $AsCl_3$; $AsI_3$; $AsOCl$; $H_2AsO_4 \cdot \frac{1}{2}H_2O$; $H_2AsO_7$. | 1)*Silverdiethyldithiocarbamate; 2)*Stannous chloride; 3)*Silver nitrate + *HCl + Zn 4)Kairine(*with HCl) - *ferric chloride 5)*Ammonium sulfotellurate 6)Gold chloride | 1)? 2)brownish-black 3)a)lemon yellow b)blue to blue-red 4)red-brown 5)black 6)metallic gold |
| Selenium (#34) | $SeO_2$; $H_2SeO_3$; $H_2SeO_4$ | 1)3,3'-Diaminobenzene 2)*Hydriodic acid 3)Pyrrole 4)Diphenylhydrazine 5)*Thiourea (solid) 6)*Ferrous sulfate 7)*Thiourea (10% solution) 8)1,8-Naphthalenediamine 9)4-Dimethylamino-1,2-phenylenediamine 10)4-Methylthio-1,2-phenylenediamine | 1)? 2)red-brown 3)blue 4)red-violet 5)red 6)reduction to Se 7)red-blue fluorescence 8)brown 9)red 10)blue |
| Tellurium (#62) | $H_6TeO_6$ | 1)*Hypophosphorous acid 2)*Alkali Stannite 3)Formation of complex cupric (III) tellurate 4)*Ferrous sulfate and *phosphoric acid 5)*Ammonium polysulfide and sodium sulfite | 1)black or grey 2)black or grey 3)yellow 4)reduction to Te 5)black |

Table 6 represents halogens, corresponding water soluble salts, resultant inorganic precipitants, color of the precipitant as well as a references.

TABLE 6

| Halogens | Water Soluble Salts | PRECIPITANTS. Inorganic precipitants *water soluble | Color of Product |
|---|---|---|---|
| Fluorine (#9) | Fluorides; Silicofluoride; Boron fluoride, etc, | 1)Alizarin Fluorine Blue + Lanthanum (III) ion<br>2)Zirconium alizarinate<br>3)Zirconium azoarsenate<br>4)Thymol blue and zirconium salt<br>5)Xylenol orange and zircomium salt | 1)red to blue<br><br>2)red-violet<br>3)brown to red<br>4)blue<br>5)orange |
| Chlorine (#17) | HClO3•7H2O; HClO4; Cl2O; ClO2; and most chlorate compounds Hypochlorites are tested with 4), 5)&6)., Chlorites use 7) Chlorides use 8) | 1)N,N-Dethyl-1.4-phenylenediamine<br>2)*Manganese sulfate and *Phosphoric acid<br>3)*Triphenylselenonium salts<br>4)*Safranin(C.I. Basic Red)<br>5)*Thallous hydroxide<br>6)ZnCl$_2$ + KI + starch<br>7)Nickel hydroxide<br>8)Formation of chromyl chloride + diphenylcarbizide | 1)?<br><br>2)violet<br><br>3)white<br>4)violet<br>5)brown<br>6)blue<br>7)black<br>8)violet |
| Bromine (#35) | HBrO3; and most bromate compounds, Hypobromites are tested with 6), 7), 8). Bromides use 11) | 1)*Fluorescein<br>2)Phenol Red<br>3)*Manganese sulfate and *Sulfuric acid + Benzidene<br>4)*Fuchsin<br>5)*Permolybdate and alpha-napthaflavone<br>6)*Safranin(C.I. Basic Red)<br>7)*Thallous hydroxide<br>8)*ZnCl$_2$ + *KBr + fluorescein<br>9)*Sulfanilic acid<br><br>10)*Phosphomolybdic acid + *sulfosalicylic acid<br>11)*KMnO$_4$ + *CuSO$_4$ + *iodide + starch | 1)pink to red<br>2)?<br>3)red<br><br>4)violet<br>5)orange-red<br><br>6)violet<br>7)brown<br>8)red<br>9)violet to brown<br>10)blue or green<br>11)blue |
| Iodine (#35) | H5IO6; I2O5; and many iodide and iodate compounds, KI, KIO3 etc. Iodates use 1), 2). 3), 16) Iodides use 13), 14), 15)and othe tests as adapted | 1)*Hypophosphorous acid + starch<br>2)*Potassium thiocyanate + starch<br>3)*Pyrogallol<br>4)Neocuproine *copper(II)<br>5)*Starch + *KI<br><br>6)*Manganeses sulfate and *Phosphorous acid + diphenylcarbizide<br>7)*Manganese salt and tetrabase<br>8)*Fluorescein<br>9))*Fluorescein + *peroxides<br>10)*Starch + *peroxides<br><br>11)*Thallous hydroxide<br>12)*ZnCl$_2$ + Thiodene<br>13)*Palladium chloride<br>14)*Potassium nitrite + starch<br>15)*AgNO$_3$<br>16)p-Aminophenol (for iodates) | 1)blue-blue black<br>2)blue-blue black<br>3)pink to red<br>4)?<br>5)blue-blue black for free Iodine<br>6)violet<br><br>7)blue<br>8)red-yellow<br>9)red-yellow<br>10)blue-blue-black<br>11)brown<br>12)blue<br>13)black-brown<br>14)blue<br>15)yellow<br>16)blue-violet |

Table 7 represents other reactants, corresponding water soluble salts, resultant inorganic precipitants, and color of the precipitant.

TABLE 7

| Metals | Water Soluble Salts | PRECIPITANTS. Inorganic precipitants *water soluble | Color of Product |
|---|---|---|---|
| Luminol | Hemin | 1) *Peroxides | 1) Intense blue luminescence |

TABLE 7-continued

| Metals | Water Soluble Salts | PRECIPITANTS. Inorganic precipitants *water soluble | Color of Product |
|---|---|---|---|
| Amino Acids | Glycocoll, alanine, 1-asparginic acid, tyrosine, diiodotyrosine, d-arginine, etc, | 1) *Sodium hypochlorite (saturated solution) + Fuchsin-sulfurous acid | 1) red |
| Proteins | Egg albumin, hemoglobin, serum albumin, casein, any other native protein, etc. | 1) *Tetrabromonaphthalein ethyl ester (potassium salt) | 1) yellow to blue |
| Nitrogen (#7) | A) Nitrate | A) 1) Brucine<br>2) Chromotropic acid<br>3) Sulfanilamide + N-(1-Naphthyl)ethylenediamine dihydrochloride | A) 1) ?<br>2) ?<br>3) ? |
| | B) Nitrite | B) 1) Sulfanilamide + N-(1-Naphthyl)ethylenediamine dihydrochloride<br>2) Sulfanilic acid + 1-Naphthylamine | B) 1) ?<br><br><br>2) ? |
| | C) Nitric Acid | C) 1) *Ferrous sulfate (soliD) and *sulfuric acid<br>2) Diphenylamine or diphenylbenzidene<br>3) Brucine<br>D) 1) Alpha-naphthylamine and sulfanilic acid<br>2) 1,8-Naphthalenediamie<br>3) *Iodide and starch<br>4) Chrysean<br>5) Benzidene<br>6) *Ferrous sulfate and *acetic acid | C) 1) brown ring around crystal<br>2) blue<br><br>3) red<br>D) 1) red<br><br>2) orange-red<br>3) blue<br>4) red to dark brown<br>5) yellow to brown<br>6) brown ring around crystal |
| Sulfur (#16) | A) Persulfuric acid<br>B) Sulfuric acid (soluble sulfate)<br>C) Sulfuric acid (free)<br>D) Sulfurous acid<br>Sulfates A)<br>Sulfides D)<br>Sulfites D) | A) Benzidene<br>B) Barium rhodizonate<br><br>C) *Glucose<br>D) 1) *Sodium nitroprusside<br>2) *Zinc nitroprusside<br><br>3) Decolorization of malachite green<br>4) 2-Benzylpyridene | A) blue<br>B) red-brown<br><br>C) charring<br>D) 1) red<br>2) pink to dark red<br>3) decolrization<br><br>4) red |

Many other reactions as shown in "Qualitative Analysis By Spot Tests", Feigl (1946 ed.) and newer can also be used. All water soluble substances, whether Inorganic, Organic, Proteinaceous, Enzymatic, etc. Precipitants include water soluble reagents or reagents that can be made water soluble by alkali or acid treatment and that individually or together withanother water soluble or dispersible reagent can cause a color to form either as a precipitate or as a color on a filter paper.

Fluorescent indicators are substances which show definite changes in fluorescence with change in pH. A long wavelength ultraviolet lamp is used to show the fluorescence. Referring to table 8 there are shown representative fluorescent indicators which can be used with the present invention.

TABLE 8

| Name | pH range | Color change acid to base | Indicator solution |
|---|---|---|---|
| Benzoflavine | −0.3 to 1.7 | Yellow to green | 1 |
| 3,6-Dihydroxyphthalimide | 0 to 2.4 | Blue to green | 1 |
| | 6.0 to 8.0 | Green to yellow/green | |
| Eosin (tetrabromofluorescein) | 0 to 3.0 | Non-fl to green | 4, 1% |
| 4-Ethoxyacridone | 1.2 to 3.2 | Green to blue | 1 |
| 3,6-Tetramethyldiaminoxanthone | 1.2 to 3.4 | Green to blue | 1 |
| Esculin | 1.5 to 2.0 | Weak blue to strong blue | |

TABLE 8-continued

| Name | pH range | Color change acid to base | Indicator solution |
|---|---|---|---|
| Anthranilic acid | 1.5 to 3.0 | non-fl to light blue | 2 (50% ethanol) |
| | 4.5 to 6.0 | Light blue to dark blue | |
| | 12.5 to 14 | Dark blue to non-fl | |
| 3-Amino-1-naphthoic acid | 1.5 to 3.0 | Non-fl to green | 2 (as sulfate in 50% ethanol) |
| | 4.0 to 6.0 | Green to blue | |
| | 11.6 to 13.0 | Blur to non-fl | |
| 1-Naphthylamino-6-sulfonamide | 1.9 to 3.9 | Non-fl to green | 3 |
| (also the 1-, 7-) | 9.6 to 13.0 | Green to non-fl | |
| 2-Naphthylamino-6-sulfonamide | 7.9 to 3.9 | Non-fl to dark blue | 3 |
| (also the 2-, 8-) | 9.6 to 13.0 | Dark blue to non-fl | |
| 1-Naphthylamino-5-sulfonamide | 2.0 to 4.0 | Non-fl to yellow/orange | 3 |
| | 9.5 to 13.0 | Yellow/orange to non-fl | |
| 1-Naphothoic acid | 2.5 to 3.5 | Non-fl to blue | 4 |
| Salicyclic acid | 2.5 to 4.0 | Non-fl to dark blue | 4 (0.5%) |
| Phloxin BA extra (tetrachlorotetrabromofluorescein) | 2.5 to 4.0 | Non-fl to dark blue | 2 |
| Erythrosin B (tetraiodofluorescein) | 2.5 to 4.0 | Non-fl to light green | 4 (0.2%) |
| 2-Naphthylamine | 2.8 to 4.4 | Non-fl to violet | 1 |
| Magdala red | 3.0 to 4.0 | Non-fl to purple | |
| p-Aminophenylbenzenesulfonamide | 3.0 to 4.0 | Non-fl to light blue | 3 |
| 2-Hydroxy-3-naphthoic acid | 3.0 to 6.8 | Blue to green | 4 (0.1%) |
| Chromotropic acid | 3.1 to 4.4 | Non-fl to light blue | 4 (5%) |
| 1-Naphthionic acid | 3 to 4 | Non-fl to blue | 4 |
| | 10 to 12 | Blue to yellow-green | |
| 1-Naphthylamine | 3.4 to 4.8 | Non-fl to blue | 1 |
| 5-Aminosalicylic acid | 3.1 to 4.4 | Non-fl to light green | 1 (0.2% fresh) |
| Quinine | 3.0 to 5.0 | Blue to weak violet | 1 (0.1%) |
| | 9.5 to 10.0 | Weak violet to non-fl | |
| o-Methoxybenzaldehyde | 3.1 to 4.4 | Non-fl to green | 4 (0.2%) |
| o-Phenylenediamine | 3.1 to 4.4 | Green to non-fl | 5 |
| p-Phenylenediamine | 3.1 to 4.4 | Non-fl to orange/yellow | 5 |
| Morin(2',4',3,5,7-pentahydroxyflavone | 3.1 to 4.4 | Non-fl to green | 6 (0.2%) |
| | 8 to 9.8 | Green to yellow/green | |
| Thioflavine S | 3.1 to 4.4 | Dark blue to light blue | 6 (0.2%) |
| Fluorescein | 4.0 to 4.5 | Pink/green to green | 4 (1%) |
| Dichlorofluorescein | 4.0 to 6.6 | Blue green to green | 1 |
| β-Methylescletin | 4.0 to 6.2 | Non-fl to blue | 1 |
| | 9.0 to 10.0 | Blue to light green | |
| Quininic acid | 4.0 to 5.0 | Yellow to blue | 6 (satd) |
| β-Naphthoquinoline | 4.4 to 6.3 | Blue to non-fl | 3 |
| Resorufin(7-oxyphenoxazone) | 4.4 to 6.4 | Yellow to orange | |
| Acridine | 5.2 to 6.6 | Green to violet | 2 |
| 3,6-Dihydroxyxanthone | 5.4 to 7.6 | Non-fl to blue/violet | 1 |
| 5,7-Dihydroxy-4-methylcoumarin | 5.5 to 5.8 | Light blue to dark blue | |
| 3,6-Dihydroxyphthalic acid dinitrile | 5.8 to 8.2 | Blue to green | 1 |
| 1,4-Dihydroxybenzenedisulfonic acid | 6 to 7 | Non-fl to light blue | 4 (0.1%) |
| Luminol | 6 to 7 | Non-fl to blue | |
| 2-Naphthol-6-sulfonic acid | 5-7 to 8-9 | Non-fl to blue | 4 |
| Quinoline | 6.2 to 7.2 | Blue to Non-fl | 6 (satd) |
| 1-Naphthol-5-solfonic acid | 6.5 to 7.5 | Non-fl to green | 6 (satd) |

TABLE 8-continued

| Name | pH range | Color change acid to base | Indicator solution |
|---|---|---|---|
| Umbelliferone | 6.5 to 8.0 | Non-fl to blue | |
| Magnesium-8-hydroxyquinolinate | 6.5 to 7.5 | Non-fl to yellow | 6 (0.1% in 0.01 M HCl) |
| Orcinaurie | 6.5 to 8.0 | Non-fl to green | 6 (0.03%) |
| Diazo brilliant yellow | 6.5 to 7.5 | Non-fl to blue | |
| Coumaric acid | 7.2 to 9.0 | Non-fl to green | 1 |
| β-Methylumbelliferone | >7.0 | Non-fl to blue | 2 (0.3%) |
| Harmine | 7.2 to 8.9 | Blue to yellow | |
| 2-Naphthol-6,8-disulfonic acid | 7.5 to 9.1 | Blue to light blue | 4 |
| Salicylaldehyde semicarbazone | 7.6 to 8.0 | Yellow to blue | 2 |
| 1-Naphthol-2-sulfonic acid | 8.0 to 9.0 | Dark blue to light blue | 4 |
| Salicylaldehyde acetylhydrazone | 8.3 | Non-fl to green/blue | 2 |
| Salicylaldehyde thiosemicarbazone | 8.4 | Non-fl to blue/green | 2 |
| 1-Naphthol-4-solfonic acid | 8.2 | Dark blue to the light blue | 4 |
| Naphthol AS | 8.2 to 10.3 | Non-fl to yellow/green | 4 |
| 2-Naphthol | 8.5 to 9.5 | Non-fl blue | 2 |
| Acridine orange | 8.4 to 10.4 | Non-fl to yellow/green | |
| Orcinsulfonephthalein | 8.6 to 10.0 | Non-fl to yellow | |
| 2-Naphthol-3,6-disulfonic acid | 9.0 to 9.5 | Dark blue to light blue | 4 |
| Ethoxyphenylnaphthostilbazonium chloride | 9 to 11 | Green to non-fl | 1 |
| o-Hydroxyphenylbenzothiazole | 9.3 | Non-fl to blue green | 2 |
| o-Hydrozyphenylbenzoxazole | 9.3 | Non-fl to blue/violet | 2 |
| o-Hydroxyphenylbenzimidazole | 9.9 | Non-fl to blue/violet | 2 |
| Coumarin | 9.5 to 10.5 | Non-fl to light green | |
| 6,7-Dimethoxyisoquinoline-1-carboxylic acid | 935 to 11.0 | Yellow to blue | 0.1% in clycerine/ethanol/water in 2:2:18 ratio |
| 1-Naphthylamino-4-sulfonamide | 9.5 to 13.0 | dark blue to white/blue | 3 |

Some of the common acid-base indicators which can be used with the present invention are shown in table 9 with the corresponding pH range.

TABLE 9

| | pH range | | Color | |
|---|---|---|---|---|
| Indicator | Minimum | Maximum | Acid | Alkaline |
| Brilliant cresyl blue | 0.0 | 1.0 | red-orange | blue |
| Methyl violet | 0.0 | 1.6 | yellow | blue |
| Crystal violet | 0.0 | 1.8 | yellow | blue |
| Ethyl violet | 0.0 | 2.4 | yellow | blue |
| Methyl violet 6B | 0.1 | 1.5 | yellow | blue |
| Cresyl red | 0.2 | 1.8 | red | yellow |
| 2-(p-Dimethylaminophenylazo) pyridine | 0.2 | 1.8 | yellow | blue |
| Malachite green | 0.2 | 1.8 | yellow | blue-green |
| Methyl green | 0.2 | 1.8 | yellow | blue |
| Cresol red (o-Cresolsulfonephthalein) | 1.0 | 2.0 | red | yellow |
| Quinaldine red | 1.0 | 2.2 | colorless | red |
| p-Methyl red | 1.0 | 3.0 | red | yellow |
| Metanil yello | 1.2 | 2.3 | red | yellow |
| Pentamethoxy red | 1.2 | 2.3 | red-violet | colorless |
| Metanil yellow | 1.2 | 2.4 | red | yellow |
| p-Phenylazodiphenylamine | 1.2 | 2.6 | red | yellow |
| Thymol blue (Thymolsulfonephthalein) | 1.2 | 2.8 | red | yellow |
| m-Cresol purple | 1.2 | 2.8 | red | yellow |

TABLE 9-continued

| Indicator | pH range | | Color | |
| --- | --- | --- | --- | --- |
| | Minimum | Maximum | Acid | Alkaline |
| p-Xylenol blue | 1.2 | 2.8 | red | yellow |
| Benzopurpurin 4B | 1.2 | 3.8 | violet | red |
| Tropeolin OO | 1.3 | 3.2 | red | yellow |
| Orange IV | 1.4 | 2.8 | red | yellow |
| 4-o-Tolylazo-o-toluidine | 1.4 | 2.8 | orange | yellow |
| Methyl violet 6B | 1.5 | 3.2 | blue | violet |
| Phloxine B | 2.1 | 4.1 | colorless | pink |
| Erythrosine, disodium salt | 2.2 | 3.6 | orange | red |
| Benxopupurine 4B | 2.2 | 4.2 | violet | red |
| N,N-dimethyl-p-(m-tolylazo) aniline | 2.6 | 4.8 | red | yellow |
| 2,4-Dinitrophenol | 2.8 | 4.0 | colorless | yellow |
| N,N-Dimethyl-p-phenylazoaniline | 2.8 | 4.4 | red | yellow |
| Methyl yellow | 2.9 | 4.0 | red | yellow |
| Bromophenol blue | 3.0 | 4.6 | yellow | blue-violet |
| Tetrabromophenol blue | 3.0 | 4.6 | yellow | blue |
| Direct purple | 3.0 | 4.6 | blue-purple | red |
| Congo red | 3.1 | 4.9 | blue | red |
| Methyl orange | 3.1 | 4.4 | red | yellow |
| Bromochlorophenol blue | 3.2 | 4.8 | yellow | blue |
| Ethyl orange | 3.4 | 4.8 | red | yellow |
| p-Ethoxychrysoidine | 3.5 | 5.5 | red | yellow |
| Alizarin sodium sulfonate | 3.7 | 5.2 | yellow | violet |
| α-Naphthyl red | 3.7 | 5.7 | red | yellow |
| Bromocresol green | 3.8 | 5.4 | yellow | blue |
| Resazurin | 3.8 | 6.4 | orange | violet |
| Bromophenol green | 4.0 | 5.6 | yellow | blue |
| 2,5-Dinitrophenol | 4.0 | 5.8 | colorless | yellow |
| Methyl red | 4.2 | 6.2 | red | yellow |
| 2-(p-Dimethylaminophenylazo) pyridine | 4.4 | 5.6 | red | yellow |
| Lacmoid | 4.4 | 6.2 | red | blue |
| Azolitmin | 4.5 | 8.3 | red | blue |
| Litmus | 4.5 | 8.3 | red | blue |
| Alizarin red S | 4.6 | 6.0 | yellow | red |
| Chlorophenol red | 4.8 | 6.4 | yellow | red |
| Cochineal | 4.8 | 6.2 | red | violet |
| Propyl red | 4.8 | 6.6 | red | yellow |
| Hematoxylin | 5.0 | 6.0 | red | blue |
| Bromocresol purple | 5.2 | 6.8 | yellow | violet |
| Bromophenol red | 5.2 | 7.0 | yellow | red |
| Chlorophenol red | 5.4 | 6.8 | yellow | red |
| p-Nirophenol | 5.6 | 6.6 | colorless | yellow |
| Alizarin | 5.6 | 7.2 | yellow | red |
| Bromothymol blue | 6.0 | 7.6 | yellow | blue |
| Indo-oxine | 6.0 | 8.0 | red | blue |
| Bromophenol blue | 6.2 | 7.6 | yellow | blue |
| m-Dinitrobenzoylene urea | 6.4 | 8.0 | colorless | yellow |
| Phenol red (Phenolsulfonephthalein) | 6.4 | 8.0 | yellow | red |
| Rosolic acid | 6.4 | 8.0 | yellow | red |
| Brilliant yellow | 6.6 | 7.9 | yellow | orange |
| Quinoline blue | 6.6 | 8.6 | colorless | blue |
| Neutral red | 6.8 | 830 | red | orange |
| Phenol red | 6.8 | 8.4 | yellow | yellow |
| m-Nitrophenol | 6.8 | 8.6 | colorless | yellow |
| Cresol red (o-Cresolsulfonephthalein) | 7.0 | 8.8 | yellow | red |
| α-Naphtholphthalein | 7.3 | 8.8 | yellow | blue |
| Curcumin | 7.4 | 8.6 | yellow | red |
| m-Cresol purple (m-Cresolsulfonephthalein) | 7.4 | 9.0 | yellow | violet |
| Tropeolin OOO | 7.6 | 8.9 | yellow | rose-red |
| 2,6-Divanillydenecyclohexanone | 7.8 | 9.4 | yellow | red |
| Thymol blue (Thymolsulfonephthalein) | 8.0 | 9.6 | yellow | purple |
| p-Xylenol blue | 8.0 | 9.6 | yellow | blue |
| Turmeric | 8.0 | 10.0 | yellow | orange |
| Phenolphthalein | 8.0 | 10.0 | colorless | red |
| o-Cresolphthalein | 8.2 | 9.8 | colorless | red |
| p-Naphtholphthalein | 8.2 | 10.0 | colorless | pink |
| Ethyl bis(2,4-dimethylphenylacetate) | 8.4 | 9.6 | colorless | blue |

TABLE 9-continued

|  | pH range | | Color | |
| --- | --- | --- | --- | --- |
| Indicator | Minimum | Maximum | Acid | Alkaline |
| Ethyl bis(2,4-dimtrophenyl acetate) | 8.4 | 9.6 | colorless | blue |
| α-Naphtholbenzein | 8.5 | 9.8 | yellow | green |
| Thymolphthalein | 9.4 | 10.6 | colorless | blue |
| Nile blue A | 10.0 | 11.0 | blue | purple |
| Alizarin yellow CG | 10.0 | 12.0 | yellow | lilac |
| Alizarin yellow R | 10.2 | 12.0 | yellow | orange red |
| Salicyl yellow | 10.0 | 12.0 | yellow | orange-brown |
| Diazo violet | 10.1 | 12.0 | yellow | violet |
| Nile blue | 10.1 | 11.1 | blue | red |
| Curcumin | 10.2 | 11.8 | yellow | red |
| Malchite green gydrochloride | 10.2 | 12.5 | green-blue | colorless |
| Methyl blue | 10.6 | 13.4 | blue | pale violet |
| Brilliant cresyl blue | 10.8 | 12.0 | blue | yellow |
| Alizarin | 11.0 | 12.4 | red | purple |
| Nitramine | 11.0 | 13.0 | colorless | orange-brown |
| Poirier's blue | 11.0 | 13.0 | blue | violet-pink |
| Tropeolin O | 11.0 | 13.0 | yellow | orange |
| Indigo carmine | 11.4 | 13.0 | blue | yellow |
| Sodium indigosulfonate | 11.4 | 13.0 | blue | yellow |
| Orange G | 11.5 | 14.0 | yellow | pink |
| 2,4,6-Trinitrotoluene | 11.7 | 12.8 | colorless | orange |
| 1,3,5-Trinitrobenzene | 12.0 | 14.0 | colorless | orange |
| 2,4,6 Trinitrobenzoic acid | 12.0 | 13.4 | blue | violet-pink |
| Clayton yellow | 12.2 | 13.2 | yellow | amber |

Some of the oxidation-reduction indicators which can be used with the present invention are shown in table 10.

TABLE 10

| Name | Reduction (30° C.) in pH = 0 | Potential Volts at pH = 7 | Suitable pH range | Color Change Upon Oxidation |
| --- | --- | --- | --- | --- |
| Bis(5-bromo-1,10-phenanthroline) ruthenium(II) dinitrate | 1.41* | | | Red to faint blue |
| Tris(5-nitro-1,10-phenanthroline) iron(II) sulfate | 1.25* | | | Red to faint blue |
| Iron(II)-2,2',2"-tripyridine sulfate | 1.25* | | | Pink to faint blue |
| Tris(4,7-diphenyl01,10-phenanthroline) iron(II) disulfate | 1.13 (4.6 M H$_2$SO$_4$)* 0.87 (1.0 M H$_2$SO$_4$)* | | | Red to faint blue |
| o,m¹-Diphenylaminedicarboxylic acid | 1.12 | | | Colorless to blue violet |
| Setopaline | 1.06 (trans) | | | Yellow to orange |
| p-Nitrodiphenylamine | 1.06 | | | Colorless to violet |
| Tris(1,10-Phenanthroline)-iron(II) sulfate | 1.06 (1.00 M H$_2$SO$_4$)* 1.00 (3.0 M H$_2$SO$_4$)* 0.89 (6.0 M H$_2$SO$_4$)* | | | Red to faint blue |
| Setoglaucine O | 1.01 (trans) | | | Yellow-green to yellow red |
| Xylene cyanole FF | 1.00 (trans) | | | Yellow-green to pink |
| Erioglaucine A | 1.00 (trans) | | | Green yellow to bluish red |
| Eriogreen | 0.99 (trans) | | | Green yellow to orange |
| Tris(2,2'-bipyridine)-iron(II) hydrochloride | 0.97* | | | Red to faint blue |
| 2-Carboxydiphenylamine[N-phenyl-anthranilic acid] | 0.94 | | | Colorless to pink |
| Benxidine dihydrochloride | 0.92 | | | Colorless to blue |
| o-Toluidine | 0.87 | | | Colorless to blue |

TABLE 10-continued

| Name | Reduction (30° C.) in pH = 0 | Potential Volts at pH = 7 | Suitable pH range | Color Change Upon Oxidation |
|---|---|---|---|---|
| Bis(1,10-phenanthroline)-osmium(II) perchlorate | 0.859 (0.1 M H$_2$SO$_4$) | | | Green to pink |
| Diphenylamine-4-sulfonate (Na salt) | 0.85 | | | Colorless to violet |
| 3,3'-Dimethoxybenzidine dihydrochloride [o-dianisidine] | 0.85 | | | Colorless to red |
| Ferrocyphen | 0.81 | | | Yellow to violet |
| 4'-Ethoxy-2,4-diaminoazobenzene | 0.76 | | | Red to pale yellow |
| N,N-Diphenylbenzidine | 0.76 | | | Colorless to violet |
| [o-dianisidine] | | | | Colorless to red |
| Ferrocyphen | 0.81 | | | Yellow to violet |
| 4'-Ethoxy-2,4-diaminoazobenzene | 0.76 | | | Red to pale yellow |
| N,N-Diphenylbenzidine | 0.76 | | | Colorless to violet |
| Diphenylamine | 0.76 | | | Colorless to violet |
| N,N-Dimethyl-p-phenylenediamine | 0.76 | | | Colorless to red |
| Variamine blue B hydrochloride | 0.712 | 0.310 | 1.5-6.3 | Colorless to blue |
| N-Phenyl-1,2,4-benzenetriamine | 0.70 | | | Colorless to red |
| Bindschedler's green | 0.680 | 0.224 | 2-935 | |
| 2,6-Dichloroindophenol (Na salt) | 0.668 | 0.217 | 6.3-11.4 | Colorless to blue |
| 2,6-Dibromophenolindophenol | 0.668 | 0.216 | 7.0-12.3 | Colorless to blue |
| Brilliant cresyl blue [3-amino-9-dimethyl-amino-10-methylphenoxyazine chloride] | 0.583 | 0.047 | 0-11 | Colorless to blue |
| Iron (II)-tetrapyridine chloride | 0.59 | | | Red to faint blue |
| Thionine [Lauth's violet] | 0.563 | 0.064 | 1-13 | Colorless to violet |
| Starch (soluble potato, I$_3$ present) | 0.54 | | | Colorless to blue |
| Gallocyanine (25° C.) | | 0.021 | | Colorless to violet |
| Methylene blue | 0.532 | 0.011 | 1-13 | Colorless to blue |
| Nile blue A [aminonaphthodiethylamino-phenoxazine sulfate] | 0.406 | −0.199 | 1.4-12.3 | Colorless to blue |
| Indigo-5,5',7,7'-tetrasulfonic acid (Na salt) | 0.365 | −0.046 | <9 | Colorless to blue |
| Indigo-5,5',7-trisulfonic acid (Na salt) | 0.332 | −0.081 | <9 | Colorless to blue |
| Indigo-5,5'-disulfonic acid (Na salt) | 0.291 | −0.125 | <9 | Colorless to blue |
| Phenosafranine | 0.280 | −0.252 | 1-11 | Colorless to violet |
| Indigo-5-monosulfonic acid (Na salt) | 03262 | −0.157 | <9 | Colorless to blue |
| Safranine T | 0324 | −03289 | 1-12 | Colorless to violet |
| Bis(dimethylglyoximato)-iron(II) chloride | 0.155 | | 6-10 | Red to colorless |
| Induline scarlet | 0.047 | −0.299 | 3-8.6 | Colorless to red |
| Neutral red | | −0.323 | 2-11 | Colorless to red-violet |

FIG. 1 is a perspective view of a preferred embodiment of the indicator of the present invention. For exemplary purposes only, the embodiment of a freeze-thaw indicator will be discussed; however, other embodiments are equally available for use. The device 10 comprises a housing 20 and a capsule 30. Housing 20 defines an interior 22. Interior 22 is bounded by a first surface 24 and a second surface 27 (see FIG. 4). A first reactant 26 is provided within housing 20. Reactant 26 may be located within housing 20 in various ways. For example, reactant 26 can be applied directly to surface 24 or reactant 26 may be applied to a piece of material, such as filter paper, and the material placed inside housing 20. In addition to filter paper, other carriers may also be used with the present invention.

Capsule 30 is located within housing 20. Capsule 30 contains a second reactant 32. Capsule 30 also contains a liquid 34. Liquid 34 is chosen such that it expands upon freezing. A preferred form of liquid 34 is an aqueous solution. Capsule 30 is designed such that it will fracture when liquid 34 freezes. After fracture, reactant 32 can escape capsule 30 to mix with reactant 26. This will not occur, however, while device 10 is in a frozen condition. When device 10 enters a thawed condition, liquid 34 melts/thaws, releasing reactant 32. Reactant 32 then mixes with reactant 26 to form a pigment, indicating that device 10 has made the transition from a frozen condition to a thawed condition. Note that the rigidity of housing 20 can function as a means to protect against crushing of capsule 30.

Figure 2:
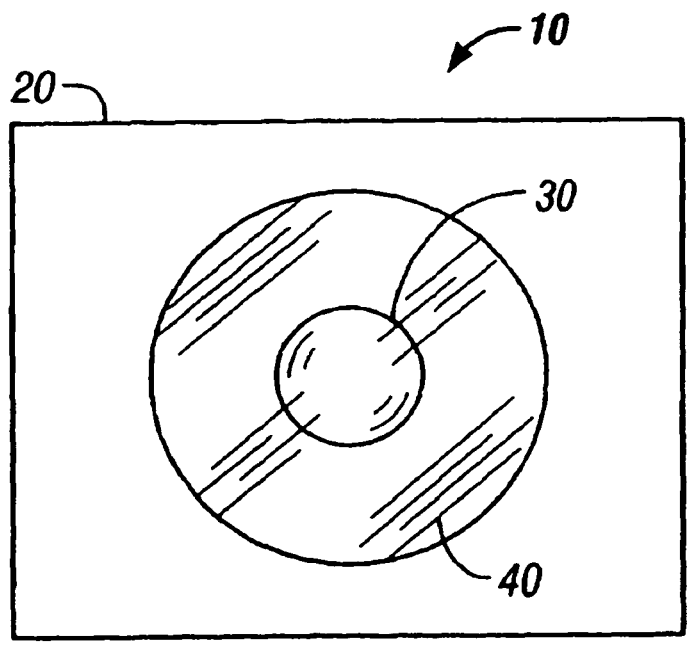
FIG. 2 is a top view of the indicator of FIG. 1 indicating a safe condition.

FIG. 2 is a top view of the freeze-thaw indicator of FIG. 1 indicating a safe condition. Either device 10 has never been frozen or has been frozen and not thawed. One can view first surface 24 through second surface 27. In this condition, surface 24 has a first color 40.

Figure 3:
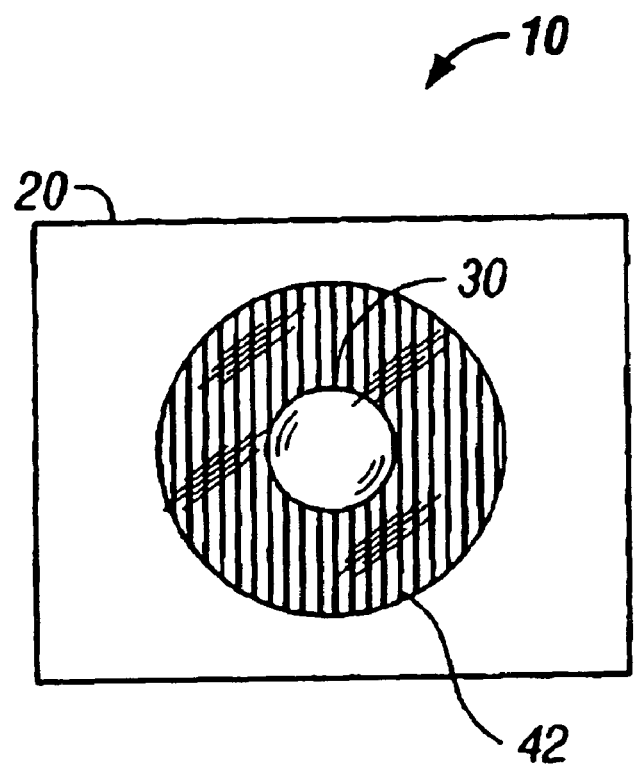
FIG. 3 is a top view of the indicator of FIG. 1 indicating a transition from a temperature below the threshold temperature to a temperature above the threshold temperature.

FIG. 3 is a top view of the freeze-thaw indicator of FIG. 1 indicating a transition from a frozen condition to a thawed condition. Device 10 has been frozen and capsule 30 has been fractured. Reactants 32 and 26 have combined to form a pigment. This pigment causes surface 24 to become brilliantly colored to a second color 42, color 42 being different than color 40. Alternatively, if reactant 26 were placed on a piece of material, the material and not necessarily surface 24 will become colored upon mixture of reactants 26, 32. Thus a person can easily determine whether device 10—and therefore any item to which device 10 has been attached—has previously been frozen and thawed.

Figure 4:
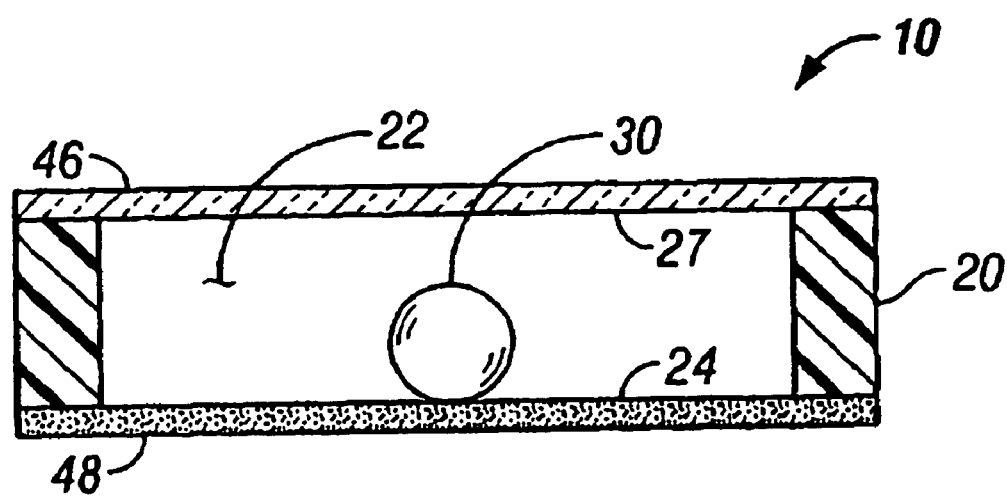
FIG. 4 is a sectional view of the indicator of FIG. 1 taken along line 4-4.

FIG. 4 is a sectional view of the freeze-thaw indicator of FIG. 1 taken along line 4-4. It is seen that in a preferred embodiment, housing 20 can have two layers 46, 48. At least a portion of layer 46 is transparent, allowing one to view inside housing 20. At least a portion of layer 48 contains an adhesive, allowing device 10 to be coupled to an item to be monitored. One preferred material for housing 20 is foamboard. This material is readily available and inexpensive. Another preferred material for housing 20 is cork. Cork is also readily available and is less crushable than foam-board, which facilitates the manufacturing process. However, housing 20 can be made of any suitable material.

For illustrative purposes only, a preferred manufacturing process will be discussed using cork as the material of housing 20. Device 10 may be manufactured by first providing an amount of cork, preferably in the form of a roll. The cork can then be machined in known fashion to form interior 22. Several interiors 22 can be formed simultaneously. Preferably, the cork has already been treated with an adhesive on each side. Alternatively, adhesive can be applied subsequent to machining interiors 22 in the cork. Once interior 22 has been formed, first reactant 26 can be added. Reactant 26 may be applied to a piece of material, such as paper, and that material placed within interior 22. Capsule 30, which has been manufactured previously and has second reactant 32 and liquid 34 located therein, is then added to interior 22. Transparent layer 46 and adhesive layer 48 can then be added on either side of housing 20, creating a closed volume for interior 22. A preferred method of attachment is lamination. The completed device 10 can then be coupled to an item to be monitored. It should be noted that the order of the steps of the above process can be altered. For example, transparent layer 46 or adhesive layer 48 can be applied to housing 20 prior to adding first reactant 26. In this manner, first reactant 26 can be applied directly to transparent layer 46 or adhesive layer 48.

The reactants discussed above cooperate to form a pigment upon mixing. Use of a pigment as an indicator is better than use of a dye for several reasons. First, pigments are insoluble in water and are solid particles rather than solutions. Dyes completely dissolve in water and are, therefore, solutions. Thus, a smaller amount of each reactant is needed to create a reliable indicator with a pigment than with a dye. This allows an indicator using pigment reactants to use fewer capsules and be smaller than an indicator using dye reactants. As few as a single capsule may be used with the present invention. A smaller indicator may be attached to more items—such as an individual vaccination vial—than are possible with a larger indicator.

Secondly, it is possible to get more "color" into pigments than into dyes. Therefore, pigmented colors tend to be more vibrant and brilliant than dye-based colors. A more brilliant, vibrant color is desirable with a changed condition indicator to increase readability and decrease the likelihood of an erroneous reading. Thus, an indicator with pigment reactants is more reliable than one with dye reactants.

Thirdly, pigment reactants are less likely to react with anything other than the complementary reactant. Thus, an indicator with pigment reactants is more reliable than one with dye reactants.

Finally, the molecules in a dye are spread out and are therefore prone to fading. The molecules in a pigment are spaced closer together and are therefore less prone to fading. If the color in an activated indicator (that is, an indicator that has been cooled below and then heated above the threshold temperature) fades, one might erroneously be lead to believe that the item to which the indicator is attached has been continuously maintained below the threshold temperature. As discussed above, this could lead to grave consequences. Thus, an indicator with pigment reactants is more reliable than one with dye reactants.

Exemplary reactants include water soluble sodium dimethylglyoxime and any water soluble nickel salt, such as nickel chloride. The sodium dimethylglyoxime could be inside the capsule and the nickel salt outside or vice versa. These reactants combine to form a brilliant scarlet, solid, colloidal crystal. These reactants are highly specific and are unlikely to form such a color with other substances. Other pigment reactants may also be used with the indicator of the present invention and other pigment colors may be produced upon a freeze-thaw transition. Once the reactants combine to form a pigment, the pigment remains even if the device is subsequently refrozen.

The capsules that are used with the present invention were manufactured using the equipment described in U.S. Pat. No. 3,389,194, the disclosure of which is incorporated herein in its entirety. Three capsule shell materials were developed. The first shell composition was made of paraffin wax. The second shell composition was made of a paraffin wax blended with a hydrocarbon resin. The third shell composition was made of a paraffin wax blended with a hydrocarbon resin and a polyethylene. Piccolyte S-115 is a preferred hydrocarbon resin. All the capsules were prepared with 5% dimethylglyoxime as a solute in water and the fill to shell ratio ranged from 50/50 to 60/40. Upon testing, the third shell composition was found to result in more completely cracked capsules upon freezing.

A preferred composition comprises 40% paraffin wax, 50% piccolyte S-115 (a hydrocarbon resin), and 10% polyethylene, with a 60% fill to 40% shell ratio. This composition was found to result in proper brittleness at freezing so that assurance of capsule cracking was increased.

The capsule composition may also be altered to provide a high temperature indicator. For example, pure paraffin wax melts at approximately 95° F. Thus, if the capsules are formed of pure paraffin wax, they will melt at approximately 95° F., allowing the reactants to mix and causing a color change. Additives, such as polyethylene, may be added to the paraffin to increase the melting temperature without adversely affecting brittleness. Thus, by selectively adding polyethylene to the paraffin wax and creating the capsules, they may be designed to melt at a predetermined temperature. The indicator can therefore function as a high temperature indicator. Note that this high temperature indicator embodiment may be used in conjunction with the low temperature embodiments discussed above and below, resulting in a dual indicating device.

Although the capsules were filled with a 5% solution of dimethylglyoxime and the co-reactant was located externally to the capsules, the location of the reactants could have been reversed. Also, the capsules could be loaded with a reducing agent such as a 10% solution of sodium bisulfite, or an acid solution, or a base solution and placed upon a colored matrix which when reduced, acidified or alkalinized changes from one color to another.

The threshold temperature at which the device of the present invention will indicate a changed condition may be varied by varying the composition of liquid 34. By adding and varying the composition of sodium dimethylglyoxime within liquid 34 within capsules 30, capsules 30 may be made to fracture at temperatures as low as −26° C. This allows indicator 10 to be used with items that should be maintained at a temperature below freezing, such as frozen vaccines.

Varying the composition of sodium dimethylglyoxime within liquid 34 may be accomplished by adding salt (NaCl) to water ($H_2O$) and encapsulating the mixture within capsule 30. By controlling the amount of salt, according to the well-known Arrhenius equation, the freezing point of liquid 34 can be adjusted to freeze, and therefore fracture capsule 30, at any temperature between 0° C. and approximately −26° C. An unexpected advantage of the salt addition is that the intensity of the color change that occurs when nickel-dimethylglyoxime pigment is formed is greater than when no additional salt other than the sodium dimethylglyoxime is present in the aqueous solution 34.

Other substances, such as propylene glycol, glycerin, magnesium chloride, calcium chloride and/or other salts, may be used to lower the freezing point of liquid 34. However, sodium chloride (NaCl) is preferred because it is inexpensive and non-toxic. Additionally, while other metallic salts might adversely interfere with the reaction, sodium chloride essentially does not, and, if anything, enhances the reaction. This is probably due to the common ion (sodium or chloride or both) effect. Substances such as alcohol, acetone, propylene glycol, and glycerin are not preferred for use in altering the freezing temperature of liquid 34 since they may soften the shell of capsule 30 if a wax composition is used.

Table 11, which was taken from "Lange's Handbook of Chemistry," Revised Tenth Edition (1966), illustrates the percent salt in an aqueous solution and the lowered freezing point resulting therefrom.

TABLE 11

| % NaCl by weight | Spec. Gravity 15° C. (59° F.) | Freezing Point °C. | Freezing Point °F. |
|---|---|---|---|
| 0 | 1.000 | 0.00 | 32.0 |
| 1 | 1.007 | −0.58 | 31.0 |
| 2 | 1.014 | −1.13 | 30.0 |
| 3 | 1.021 | −1.72 | 28.9 |
| 4 | 1.028 | −2.35 | 27.8 |
| 5 | 1.036 | −2.97 | 26.7 |
| 6 | 1.043 | −3.63 | 25.5 |
| 7 | 1.051 | −4.32 | 24.2 |
| 8 | 1.059 | −5.03 | 22.9 |
| 9 | 1.067 | −5.77 | 21.6 |
| 10 | 1.074 | −6.54 | 20.2 |
| 11 | 1.082 | −7.34 | 18.8 |
| 12 | 1.089 | −8.17 | 17.3 |
| 13 | 1.097 | −9.03 | 15.7 |
| 14 | 1.104 | −9.94 | 14.1 |
| 15 | 1.112 | −10.88 | 12.4 |
| 16 | 1.119 | −11.90 | 10.6 |
| 17 | 1.127 | −12.93 | 8.7 |
| 18 | 1.135 | −14.03 | 6.7 |
| 19 | 1.143 | −15.21 | 4.6 |
| 20 | 1.152 | −16.46 | 2.4 |
| 21 | 1.159 | −17.78 | 0.0 |
| 22 | 1.168 | −19.19 | −2.5 |
| 23 | 1.176 | −20.69 | −5.2 |
| 23.3 (E) | 1.179 | −21.13 | −6.0 |
| 24 | 1.184 | −17.0* | 1.4* |
| 25 | 1.193 | −10.4* | 13.3* |
| 26 | 1.201 | −2.3* | 27.9* |
| 26.3 | 1.203 | 0.0* | 32.0* |

*Saturation temperatures of sodium chloride dihydrate; at these temperatures $NaCl_2H_2O$ separates leaving the brine of the eutectic composition (E).

Color-coding may be used to differentiate the threshold temperature of the capsules. For example, one set of capsules 30 may be made with the natural color of the standard formulation discussed above. Another set of capsules may be prepared with salt added to the liquid 34 to adjust to the required threshold temperature, these capsules 30 being dyed light blue to distinguish them. No other change to the indicators 10 is necessary, and the same manufacturing process may be used.

Alternatively, the composition of liquid 34 could be varied such that it freezes at a temperature above 0° C. Thus, exemplary threshold temperatures include below the freezing temperature, at the freezing temperature, and above the freezing temperature. It may be desirable to determine whether capsules 30 are suitable for use prior to manufacturing device 10. To do this, one can immerse capsules 30 in a solution containing a complementary reactant to that included within capsule 30. For example, if sodium dimethylglyoxime is used as the reactant within capsules 30, the solution can contain a solution of nickel chloride. A preferred solution contains 5% nickel chloride in water, to which 20% by weight glycerol is added. If a capsule is already fractured, and therefore unsuitable for use, the reactants will combine to produce a brilliant pigment when the capsule is immersed in the solution. Those capsules that do not produce a color change are suitable for use and may be separated for subsequent use in the present invention.

During testing of the present invention, it was discovered that capsules tested according to the above process retained a coating of reactant on the outer surface of the capsule 30 when removed from the solution and allowed to dry. When the capsules 30 that tested as good for use were subsequently fractured, the reactant inside capsule 30 combined with the reactant on the outer surface of capsule 30 to form a brilliant pigment. This indicates that capsules 30 may be coated with the second reactant and used in the device 10 of the present invention, without the need of separately including a reactant in the interior 22 of housing 20.

Figure 5:
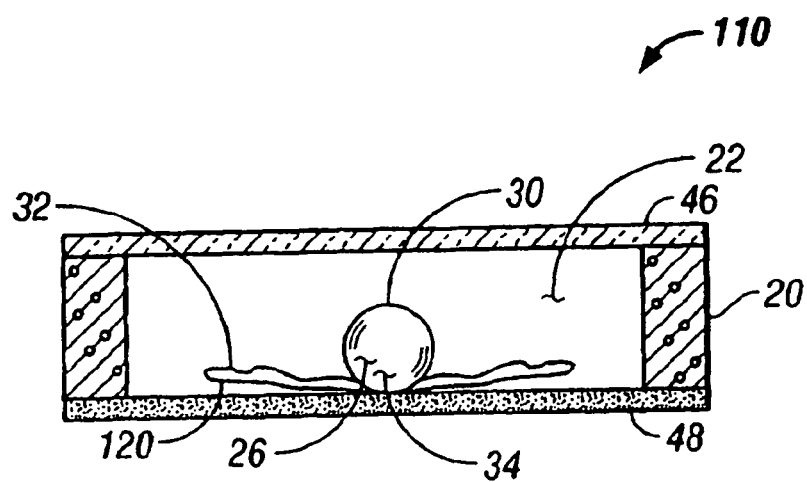
FIG. 5 is a sectional view of another preferred embodiment of the indicator of the present invention.

FIG. 5 is a sectional view of another preferred embodiment of the freeze-thaw indicator of the present invention. Device 110 comprises a housing 20 and a capsule 30 (described above). Housing 20 includes layers 46, 48 and defines a volume 22. Capsule 30 has a first reactant 26 and a liquid 34 included therein. Liquid 34 is chosen such that it expands upon freezing. Device 110 further comprises a piece of material 120. Material 120 may be impregnated with second reactant 32. Alternatively, reactant 32 may be topically applied to material 120. Material 120 may take any desired form, as long as it is able to host reactant 32. Preferred forms of material 120 include, but are not limited to, paper (such as filter paper) and cotton. Upon freezing and expansion of liquid 34, capsule 30 fractures. Upon subsequent melting or thawing of liquid 34, reactant 26 is released from capsule 30 such that it contacts material 120 and reactant 32. Reactants 26 and 32 cooperate to form a brilliant pigment, notifying a viewer that device 110—and therefor any item to which device 110 has been attached—has previously been cooled below and then heated above the threshold temperature.

Figure 6:
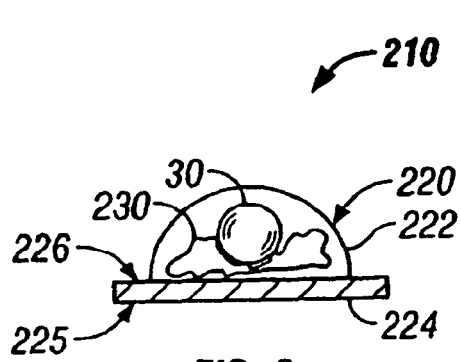
FIG. 6 is a sectional view of another preferred embodiment of the indicator of the present invention.

FIG. 6 is a sectional view of another preferred embodiment of the changed condition indicator of the present invention. Device 210 comprises a capsule 30 (described above) and a blister pack 220. Blister packs 220 are known and commonly used to package, for example, over-the-counter medications. Blister pack 220 includes a cover 222 and a backing 224. Cover 222 is substantially transparent, allowing one to view inside device 210. Backing 224 includes a first surface 225. An adhesive may be applied to surface 225 to couple device 210 to an item to be monitored. A first reactant is included within capsule 30. A second reactant may be applied to a piece of material 230, which is enclosed along with capsule 30 within blister pack 220. Alternatively, the second reactant may be applied to a second surface 226 of backing 224 using, for example, an adhesive such as latex. A preferred adhesive is polyvinyl acetate latex; a preferred reactant-latex mix includes 10-20% by volume latex. Alternatively, the second reactant may be applied to the outer surface of capsule 30. With the latter two alternatives, material 230 is not required. As discussed above, when capsule 30 fractures upon freezing and subsequently thaws, the reactants combine to form a pigment, notifying an observer that the item to which device 210 is attached has experienced a changed condition.

Figure 7:
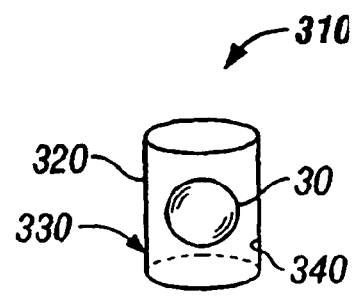
FIG. 7 is a sectional view of another preferred embodiment of the indicator of the present invention.

FIG. 7 is a sectional view of another preferred embodiment of the freeze-thaw indicator of the present invention. Device 310 comprises a housing 320 and a capsule 30. Housing 320 is substantially cylindrical and has an outer surface 330. The longitudinal ends of housing 320 may be crimped or sealed in any known manner. Device 310 may be attached to an item to be monitored in known manner, such as by applying an adhesive to surface 330. The reactants are included in any manner described above. Upon a freeze-to-thaw transition, the reactants mix as described above to produce a vibrant color, allowing one to easily determine whether the item to which device 310 is attached has been previously frozen and thawed.

Figure 8:
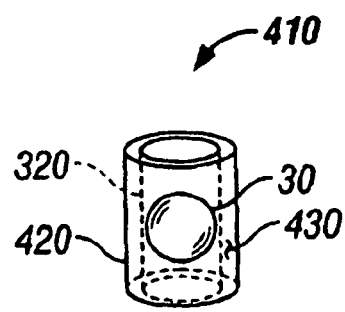
FIG. 8 is a sectional view of another preferred embodiment of the indicator of the present invention.

FIG. 8 is a sectional view of another preferred embodiment of the changed condition indicator of the present invention. The device 410 of FIG. 8 is similar to the device 310 of FIG. 7, but includes an additional housing 420. Housing 420 and housing 320 cooperate to define a volume 430. Volume 430 functions as an air space, which is an insulator. This insulation may prevent obtaining a premature indication of a thaw condition. The amount of insulation can be varied as desired by varying the relative diameters of the housings 320, 420 (which therefore will vary the size of volume 430).

A preferred method of including the second reactant for the embodiments of FIGS. 7 and 8 is to prepare a reactant-latex mix as described above. The reactant-latex mix can then be drawn into the housing 320, such as by suction. The reactant-latex mix can then be removed from housing 320, such as by draining due to gravity. A film of the mix will remain on an inner surface 340 of housing 320. During testing, it was discovered that a film formed accordingly contained enough reactant to produce a vibrant color change upon a changed condition. This process worked on a housing made of polyethylene, which is known not to be easily coated. This process also worked on a paraffin wax coating of the capsules themselves. This process is fast, inexpensive, and readily adaptable to devices of virtually any size.

By changing the reactants, the device of the present invention may also be used as a time-temperature indicator. For example, by coating the housing with a gelatin-immobilized urease (an enzyme that breaks down urea to ammonia and carbon dioxide) together with a mixture of pH indicators and filling the capsule with a urea solution, upon fracture of the capsule the reactants will mix. This will allow the urease to produce the breakdown products of urea in response to time and temperature according to the Arrhenius equation. As these products (ammonia and carbon dioxide) accumulate in response to time, temperature, or both, the pH of the coating will change. This change in pH will result in a color change based on the indicators chosen. The concentration of the urea solution can be varied in concentration to allow for various time or temperature scenarios. Note that the capsule can be fractured by either external or internal pressure. Other chemical combinations may also be used.

By providing a relatively flexible (or at least less rigid) housing 20, 220, 320, 420, a user can initiate the process by manually fracturing capsule 30. This can be done, for example, by squeezing housing 20, 220, 320, 420. The device 10, 110, 210, 310, 410 can then be attached to an item to be monitored. By doing so, an observer can determine how long the item being monitored has been in its current condition (for example, held at room temperature). Note that by providing a less rigid housing 20, 220, 320, 420, there is no need to freeze the device 10, 110, 210, 310, 410 prior to use. Device 10, 110, 210, 310, 410, when used as a time-temperature indicator, is of the same design and manufacturing as described above with respect to the changed condition indicators.

Numerous modifications and alternative embodiments of the invention will be apparent to those skilled in the art in view of the foregoing description. For example, the received signal can be delay rather than the reference sequence. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

Figure 9:
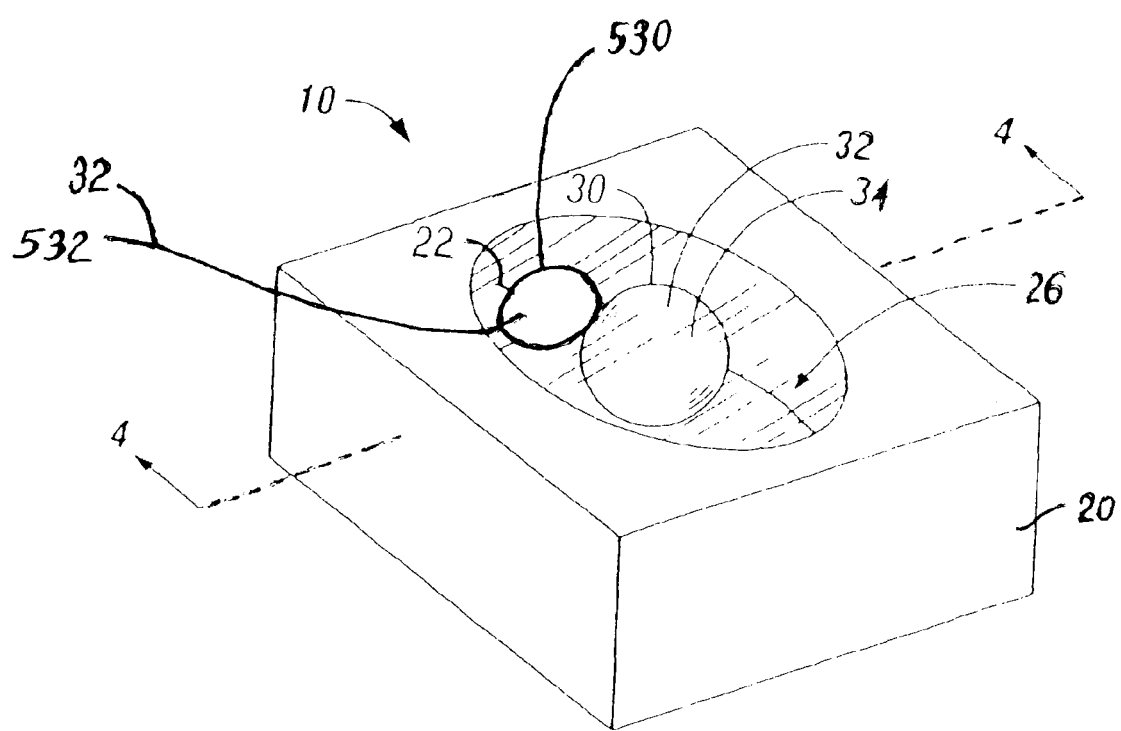
FIG. 9 is a perspective view of another preferred embodiment of the indicator of the present invention.

FIG. 9 is a perspective view of another preferred embodiment of the indicator of the present invention. Device 510 is a dual indicator that comprises a housing 20, a first reactant 26 within housing 20, a first capsule 30, (described above) and a second capsule 530 that will melt at a predetermined high temperature. Second capsule 530 contains second reactant 32 or alternatively contains a third reactant 532. After melting, second reactant 32 or third reactant 532 can escape capsule 530 to mix with first reactant 26 to produce a colored pigment.

I claim:

1. A device for indicating a transition across a threshold temperature comprising:
    a housing;
    a first surface, at least a portion of said first surface being of a first color;
    a first reactant located on said first surface within said housing;
    a capsule containing a liquid and a second reactant, said capsule being located within said housing;
    wherein said liquid freezes at a first threshold temperature and expands upon freezing whereby said capsule fractures from the liquid expansion;
    wherein said first and said second reactants combine on said first surface to produce a pigment of a second color upon mixing, said first and said second colors being different; and
    wherein said first reactant and said second reactant are salts of a weak acid-strong base and a strong acid-weak base, respectively;
    and further comprising a second capsule located within said housing and optionally a third reactant;
    wherein the formulation of said second capsule comprises a component that melts at a second threshold temperature;
    wherein said second capsule contains said second reactant or said optional third reactant;
    wherein when said optional third reactant is present, said third and first reactants combine to produce a pigment of a third color upon mixing, said third color being different from said first color; and wherein said third reactant is a salt of a strong acid weak base.

2. A device for indicating a transition across a threshold temperature comprising:
    a housing;
    a first surface, at least a portion of said first surface being of a first color;

a first reactant located on said first surface within said housing;

a capsule containing a liquid and a second reactant, said capsule being located within said housing;

wherein said liquid freezes at a first threshold temperature and expands upon freezing whereby said capsule fractures from the liquid expansion;

wherein said first and said second reactants combine on said first surface to produce a pigment of a second color upon mixing, said first and said second colors being different; and wherein said first reactant and said second reactant are salts of a strong acid-weak base and a weak acid-strong base, respectively;

and further comprising a second capsule located within said housing and optionally a third reactant;

wherein the formulation of said second capsule comprises a component that melts at a designated second threshold temperature;

wherein said second capsule contains said second reactant or said optional third reactant;

wherein when said optional third reactant is present, said third and first reactants combine to produce a pigment of a third color upon mixing, said third color being different from said first color; and wherein said third reactant is a salt of a weak acid-strong base.

3. A device for indicating a transition across a threshold temperature comprising:

a housing;

a first surface, at least a portion of said first surface being of a first color;

a first reactant located on said first surface within said housing;

a capsule containing a liquid and a second reactant, said capsule being located within said housing;

wherein said liquid freezes at a first threshold temperature and expands upon freezing whereby said capsule fractures from the liquid expansion;

wherein said first and said second reactants combine on said first surface to produce a pigment of a second color upon mixing, said first and said second colors being different; and wherein said first reactant is a salt of a weak acid-strong base or of a strong acid-weak base, and said second reactant is a water soluble reactant, or wherein said first reactant is a water soluble reactant and said second reactant is a salt of a weak acid-strong base or of a strong acid-weak base;

and further comprising a second capsule located within said housing and optionally a third reactant;

wherein the formulation of said second capsule comprises a component that melts at a designated second threshold temperature;

wherein said second capsule contains said second reactant or said optional third reactant;

wherein when said optional third reactant is present, said third and first reactants combine to produce a pigment of a third color upon mixing, said third color being different from said first color;

wherein when said first reactant is a salt of a weak acid-strong base or of a strong acid-weak base, then when said optional third reactant is present, said third reactant is a water soluble reactant; and wherein when said first reactant is a water soluble reactant, then when said optional third reactant is present, said third reactant is a salt of a weak acid-strong base or of a strong acid-weak base.

4. A device for indicating a transition across a threshold temperature comprising:

a housing, a first surface, at least a portion of said first surface being of a first color;

a first reactant located on said first surface within said housing; and a capsule containing a liquid and a second reactant, said capsule being located within said housing;

wherein said liquid freezes at a threshold temperature and expands upon freezing whereby said capsule fractures from the liquid expansion;

wherein said first and said second reactants combine to produce a pigment of a second color upon mixing, said first and said second colors being different; and wherein said pigment is fluorescent.

5. A device for indicating a transition across a threshold temperature comprising:

a housing, a first surface, at least a portion of said first surface being of a first color;

a first reactant located on said first surface within said housing;

a capsule containing a liquid and a second reactant, said capsule being located within said housing; and a third reactant located on said first surface within said housing;

wherein said liquid freezes at a threshold temperature and expands upon freezing whereby said capsule fractures from the liquid expansion;

wherein said first and said second reactants combine to produce a first product that increases in concentration over time or with a temperature change or both, wherein said first product reacts with said third reactant to produce a color change of said first surface so as to provide an exposure time-temperature threshold indicator.

6. The device of claim 5 wherein said first reactant is urease enzyme, said second reactant is urea, said first product is ammonia, and said third reactant is a pH indicator.

7. A device for indicating a transition across a threshold temperature comprising:

a housing;

a first surface, at least a portion of said first surface being of a first color;

a first reactant located on said first surface within said housing;

a capsule containing a liquid and a second reactant, said capsule being located within said housing;

wherein said liquid freezes at a threshold temperature and expands upon freezing whereby said capsule fractures from the liquid expansion;

wherein said first and said second reactants combine on said first surface to produce a pigment of a second color upon mixing, said first and said second colors being different; and wherein said first reactant and said second reactant are salts of a weak acid-strong base and a strong acid-weak base, respectively or are salts of a strong acid-weak base and a weak acid-strong base, respectively.

* * * * *